United States Patent
Giljum et al.

(10) Patent No.: US 7,404,141 B1
(45) Date of Patent: Jul. 22, 2008

(54) SYSTEM FOR CREATING AND MAINTAINING A WEBSITE

(75) Inventors: Robert Giljum, San Francisco, CA (US); John Thorpe, Washington, DC (US); Jeanne Kramer, Silver Spring, MD (US); Nilay Banker, Fremont, CA (US); Vandana Deep, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 549 days.

(21) Appl. No.: 09/540,977

(22) Filed: Mar. 31, 2000

(51) Int. Cl.
*G06F 17/00* (2006.01)
(52) U.S. Cl. ................... 715/234; 715/229; 715/751
(58) Field of Classification Search .............. 715/513, 715/500.1, 501.1, 751–759; 707/1; 709/9
See application file for complete search history.

(56) References Cited

U.S. PATENT DOCUMENTS

| | | | |
|---|---|---|---|
| 5,740,549 A | 4/1998 | Reilly et al. | |
| 5,826,258 A | 10/1998 | Gupta et al. | |
| 5,878,421 A * | 3/1999 | Ferrel et al. | 707/100 |
| 5,911,145 A | 6/1999 | Arora et al. | |
| 5,978,766 A | 11/1999 | Luciw | |
| 6,014,137 A | 1/2000 | Burns | 345/334 |
| 6,185,608 B1 | 2/2001 | Hon et al. | |
| 6,189,029 B1 | 2/2001 | Fuerst | |
| 6,192,415 B1 | 2/2001 | Haverstock et al. | |
| 6,195,652 B1 | 2/2001 | Fish | |
| 6,195,657 B1 | 2/2001 | Rucker et al. | |
| 6,199,082 B1 * | 3/2001 | Ferrel et al. | 715/522 |
| 6,223,177 B1 | 4/2001 | Tatham et al. | |
| 6,230,173 B1 * | 5/2001 | Ferrel et al. | 715/513 |
| 6,233,600 B1 * | 5/2001 | Salas et al. | 709/201 |
| 6,243,700 B1 | 6/2001 | Zellweger | |
| 6,308,188 B1 | 10/2001 | Bernardo et al. | |
| 6,317,722 B1 | 11/2001 | Jacobi et al. | |
| 6,338,149 B1 * | 1/2002 | Ciccone, Jr. et al. | 714/38 |
| 6,366,910 B1 | 4/2002 | Rajaraman et al. | |
| 6,438,580 B1 | 8/2002 | Mears et al. | |
| 6,463,460 B1 | 10/2002 | Simonoff | |
| 6,466,918 B1 | 10/2002 | Spiegel et al. | |

(Continued)

*Primary Examiner*—Stephen Hong
*Assistant Examiner*—A. M. Queler
(74) *Attorney, Agent, or Firm*—Hickman Palermo Truong & Becker

(57) ABSTRACT

A web site creation and maintenance system permits distributed control and centralized management of a web site. The physical implementation of the web site resides on a database maintained by a database administrator. The web site system permits a site administrator to construct the overall structure, design and style of the web site. This allows for a comprehensive design as well as a common look and feel for the web site. The web site system permits content for the web site to originate from multiple content contributors. The publication of content is controlled by content owners. This permits assignment of content control to those persons familiar with the content. The web site system is also a self service web site system for content contributors, content owners, and site administrators. The self service system displays to users one or more panels that contain input fields to permit the users to submit content and web site components for publication on the web site. The user, through use of only a web browser running on the user computer, transmits the parameter to the web site database. In response, the web site is updated at the database in accordance with the parameter.

12 Claims, 34 Drawing Sheets

U.S. PATENT DOCUMENTS

| | | |
|---|---|---|
| 6,516,329 B1 | 2/2003 | Smith |
| 6,643,663 B1 * | 11/2003 | Dabney et al. .............. 707/102 |
| 6,973,618 B2 * | 12/2005 | Shaughnessy et al. ....... 715/513 |
| 7,012,627 B1 * | 3/2006 | Estrada et al. .............. 715/732 |
| 2001/0042132 A1 | 11/2001 | Mayadas |
| 2002/0133494 A1 * | 9/2002 | Goedken ..................... 707/10 |
| 2003/0041063 A1 * | 2/2003 | Brady ........................ 707/10 |
| 2005/0065625 A1 * | 3/2005 | Sass ............................ 700/94 |

* cited by examiner

Web Site Managers

 Site
Establish site-wide features and settings. Set up listener settings, Control logs, system purges, and news.

 Style
Create and manage styles, which control frames, navigation bars, text, color, and background images.

Content Managers

 Folder
Manage site structure and navigation. Control access by users and groups. Apply styles and images.

 Category
Create and manage categories and associate them with graphic images.

 Perspective
Create and manage perspectives and establish their display choices.

 Custom Item Type
Create custom item types and establish optional attributes and procedures.

Access Managers

 Group
Create and manage groups. Assign group administrators.

 User
Create and manage users. Assign administrative privileges to a single user.

 Privilege
Assign administrative privileges to users.

 Personal Information
Enter information for user: TEST_SITE2_ADMIN

Toolbox

 Site Statistics
Produce and view online reports for site and folder page requests, searches, user access privileges.

 Search
Establish basic search features for Oracle and Internet search engines, and advanced search features for *inter*Media Text searches.

FIG. 5

```
                                                    Finish

User: MILLER                                                        ?
Details                                        Details    Group Assign administrator privileges, establish a password, create a personal
         folder, and edit information about the user.

Apply    Reset

Administrator Privileges
         ☐ Site, Style and News Administrator
         ☐ Style Administrator
         ☐ News Administrator Passwords
         Password:        [          ]
         Confirm Password: [          ]
         ☐ Create Personal Folder Personal Information
         First name:      [                              ]
                          [                              ]
```

FIG. 7

FIG. 16

FIG. 36

SYSTEM FOR CREATING AND MAINTAINING A WEBSITE

BACKGROUND OF THE INVENTION

1. Field of the Invention

The present invention is directed toward the field of web sites, and more particularly toward designing, creating, and maintaining web sites.

2. Art Background

Generally, a web site is a collection of text and images configured for presentation in a predetermined way. A web site may be published by a single person or published by a group of people. A company or organization is an example of a group of people that publish a web site. For example, a company may have a web site for use by its customers (e.g., sale of products), and a company may have a web site for internal use (i.e., Intranet). Typically, web sites published by a group are created and maintained through a collaborative effort. For example, a company that sells hi-tech gadgets may include, on its web site, material that describes and shows uses for the hi-tech gadgets as well as content that describes the basic technology of the hi-tech gadgets. The material that discloses uses of the hi-tech gadgets may be submitted by the company's marketing department, whereas the content that describes the basic technology of the gadgets may be submitted by the company's engineering department. Thus, it is typical to assemble content for a web site from multiple sources when creating and maintaining a web site.

Typically, to create a web site, the person, referred to as the content contributor, submits the content (e.g., files and images) to the web site administrator for publication. The web site administrator assumes the role of both constructing the web site and maintaining the implementation of the web site. The task of constructing the web site includes using HTML to link the files and images. The task of maintaining the implementation of the web site includes ensuring proper operation of the host computer, such as a web server, as well as maintaining up to date back ups of the web site. The content contributor may not be technical and may not have any knowledge of HTML. Thus, the content contributors rely on the web site administrators to publish the content.

One problem associated with this traditional approach is that funneling all the content for publication through the site administrator creates a bottleneck. For example, if a web site has multiple content contributors, all of the content contributors must funnel the content through the web site administrator prior to publishing the content. Also, this approach places all of the responsibility of approving publication of content on the web site administrator when the web site administrator may have little or no knowledge of the content. Furthermore, under this approach, there is no single responsible person for ensuring that the content is up to date and accurate.

With the increased popularity of the Internet and corporate Intranets, there is an increased demand for tools that aid in the creation and maintenance of web sites. Accordingly, it is desirable to generate a web site creation and maintenance tool that permits non-technical people to publish content on a web site. It is also desirable to generate a web site creation and maintenance tool that apportions responsibility for web site creation and maintenance task to the most appropriate individuals.

SUMMARY OF THE INVENTION

The web site creation and maintenance system permits distributed control and centralized management of a web site. In one embodiment, the physical implementation of the web site resides on a database. The database is maintained by a centralized entity, such as a database administrator. Because the web site is entirely implemented on a database, maintaining the underlying infrastructure of the web site, including back-ups, is simplified. In one embodiment, the web site system permits a site administrator to construct the overall structure, design and style of the web site. This allows for a comprehensive design as well as a common look and feel for the web site. The web site system permits content for the web site to originate from multiple sources (i.e., multiple content contributors). The publication of content is controlled by content owners. In one embodiment, the web site is organized, in part, into folders. For this embodiment, the control of the content, which originates from multiple content contributors, is distributed among folder owners. This system permits assignment of content control to those persons that are familiar with the content. Similarly, the content or folder owners maintain control over the web site users that view the web site content.

BRIEF DESCRIPTION OF THE DRAWINGS

FIG. 5 illustrates one embodiment for an administration page.

FIG. 7 illustrates one embodiment for a detailed user screen.

FIG. 16 illustrates one embodiment for a create custom item type panel.

FIG. 36 illustrates one embodiment for a create group panel.

DETAILED DESCRIPTION

Figure 1:
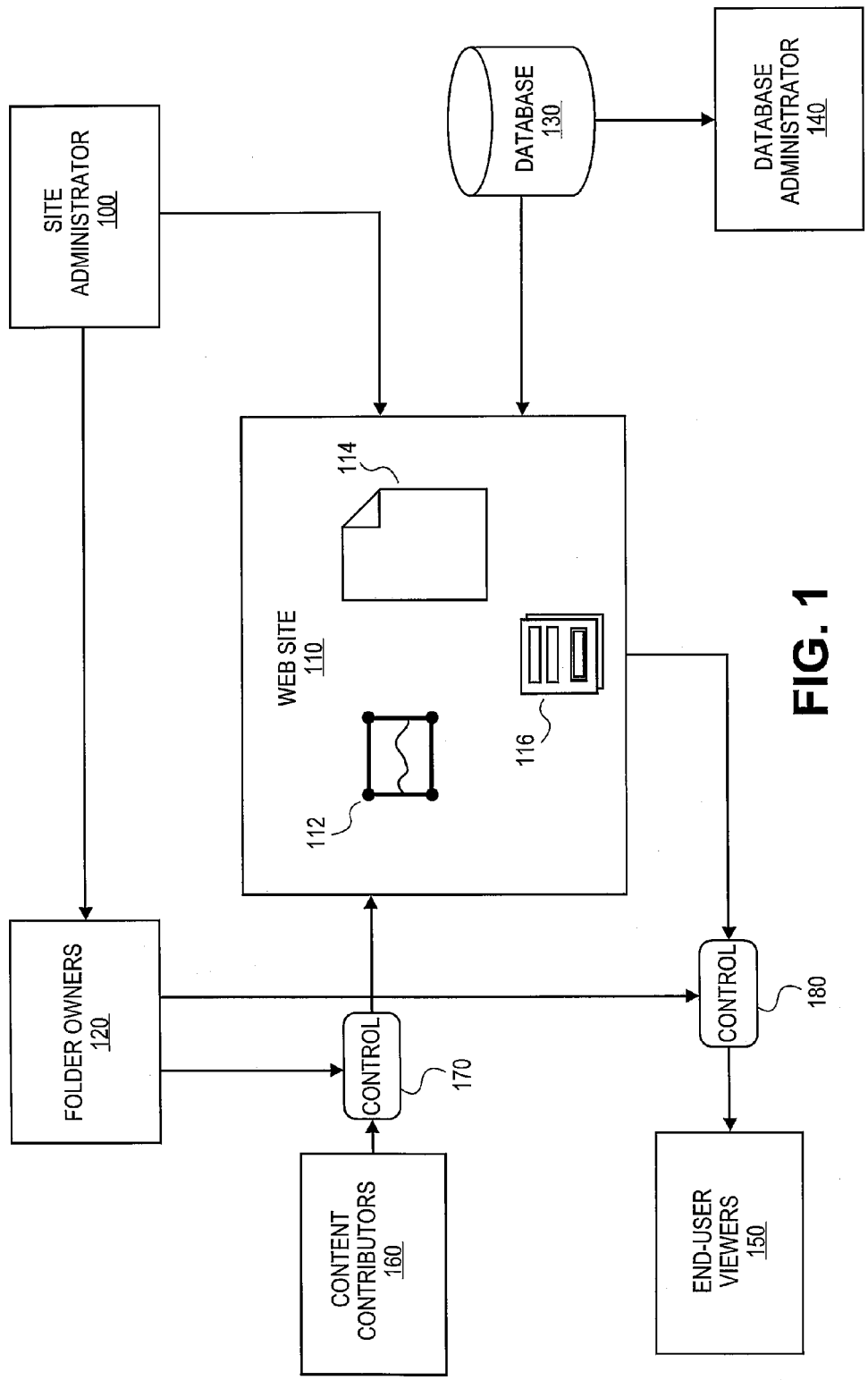
FIG. 1 is a block diagram illustrating one embodiment of the web site creation and maintenance paradigm of the present invention.

Web Site Paradigm:

FIG. 1 is a block diagram illustrating one embodiment of the web site creation and maintenance paradigm of the present invention. A web site 110 contains one or more items. By way example, the web site 110 may include documents (114), graphics (112), and forms (116). However, Web Site 110 may include any type item (i.e., content) for use with the web site paradigm of the present invention. In general, different entities are responsible for the creation, contribution and maintenance of the web site. Specifically, for the example of FIG. 1, the creation, contribution and maintenance of web site 110 is accomplished by database administrator 140, site administrator 100, content owners or folder owners 120, content contributors 160, and end-users viewers 150. Each of these entities may consist of one or more persons.

As is described more fully below, in one embodiment, the web site 110 is entirely maintained in a database (e.g., database 130 in FIG. 1). Database administrator 140 (e.g., information technology department) maintains the database. For example, database administrator 140 backs-up the database from the operating computer (e.g., web server), and ensures proper operation on the web server. Thus, this permits centralized technology maintenance of web site 110 through maintenance of database 130.

For this embodiment, site administrator 100 is responsible for the overall creation of web site 110. Specifically, site administrator 100 may design the overall structure and flow of web site 110, as well as the look and feel of web site 110. Also, in another embodiment, site administrator 100 assigns style administrators that design the look and feel of the web site (e.g., colors, font, etc.).

The web site is organized into a plurality of folders. The web site paradigm permits the creator of the Web Site to specify who owns a folder, who can add content to the folder (i.e., contributor) and who can view the items in the folder. In one embodiment, site administrator 100 may designate one or more content or folder owners 120. The folder owners 120 are responsible for controlling both the content published on web site 110 and for controlling viewing of that content. The Web Site paradigm also permits dividing these privileges to match sub-folders, classified under a parent folder. The sub-folders represent a more detailed level of classification that is best implemented via folders.

The content or folder owners 120 control the contents of their assigned folders, as well as assign privileges to those that may view the contents of their folder. The web site paradigm also permits a user to develop a security model for the user community for the overall structure of the web site. As shown in FIG. 1, content contributors 160 provided content to the web site 110. The content is controlled or filtered by folder owners 120 depicted as by control 170. Also, as shown in FIG. 1, end-user viewers 150 view the contents or items of the web site 110. The viewing of the web site contents or items is controlled by folder owners 120, as depicted by control 180.

In the prior art, content contributors must go through the information technology department in order to publish content. This prior art methodology places content publication and maintenance on a single source. In contrast, the web site paradigm of the present invention provides for distributed control by allowing the folder owners 120 to control content for a portion of the web site. The paradigm of the present invention eliminates the traditional bottleneck by providing distributed control for content management. Furthermore, because the web site is implemented on a centralized database, maintenance, including appropriate backups of the web site, is easily maintained. Furthermore, the overall structure and style of the web site is controlled by a single entity (e.g., the site administrator), permitting uniformity and commonality for the overall structure and flow of the web site. In an example motion picture web site, the contributors may comprise "movie team", the owner of the content may be "movie department head", and the viewers of the movie may be "everybody."

The web site paradigm is described herein with reference to certain nomenclature. Specifically, the system is referred to as a Web Site Database system (i.e., referring to the database implementation). However, the features of the web-based system described herein apply to other implementations. Also, the term Web Site, with "W" and "S" in capital letters, refers to a web site created and maintained using the web paradigm of the present invention. Furthermore, the Web Site Database system consists of a web site development tool for the creation and maintenance of the Web Site. A user, as referred to herein, is anyone involved in the creation, maintenance and use of the Web Site, and an end-user refers to a person viewing content of the Web Site.

In one embodiment, the Web Site Database not only provides information to its users, but also includes all the tools necessary to manage and maintain the Web Site itself (i.e., the Web Site Development Tools). When the Web Site is first displayed, users may only view public information. Users, with a valid user name and password, may log onto the Web Site and view information that they have been explicitly granted access to view. In addition, if the user has the necessary privileges, they may enter into an edit mode. In the edit mode, the user may add new information (e.g., content) to the site, or edit existing information.

The Web Site Database has a built-in structure for organizing, classifying and cross-referencing items in a web site. The Web Site Database of the present invention enables the creation of a taxonomy for the classification and organization of site content. In prior art web site design, the smallest component is a page. A page consists of an assortment of links, images and text. In the Web Site Database, the smallest component is an item. For this embodiment, pages are dynamically generated, and collections of items are displayed.

In one embodiment, the Web Site Database is organized into Web Site folders. These folders are similar to folders in a file system with multiple items existing within a folder. Each Web Site item also has an associated number of stored attributes. These attributes maintain information such as title, description and author. In general, folders divide a Web Site into distinct areas to make it easier for end-users to find the information they need. The Web Site folders provide a mechanism for the user to easily find information. A folder is generally a collection of related items (e.g., files, text, URLs, etc.). For example, a Web Site about travel may include the folders "Africa", "Americas", and "Europe", representing areas for travel.

In one embodiment, each item is classified by a category. An item may be classified in only a single category. The categories direct a user as to what a particular item is, so the user may determine whether the item contains the information sought. For an example travel Web Site, categories may include "flights", "lodging", and "restaurants." With use of categories, category pages may be called at runtime to show the end-user all items that are classified by the specified category.

The Web Site Database is optionally organized using perspectives. In general, perspectives identify areas of interest. An item may have more than one perspective. Using perspectives, the user may find items relating to their own preferences even though those items reside in different folders. For example, the travel Web Site may include perspectives for "resort", "Safari", and "skiing." Perspectives provide another dimension of classification, and items may be assigned many perspectives. Perspective pages may also be called at runtime to show the end-user all items classified by the specified perspective.

In general, styles specify the appearance of the site navigation bar, the banner at the top of each page, and the main content area. The site administrator may use one of the standard styles provided, or create a new style to ensure a common look across the entire Web Site. Site administrators may assign style administrators to create and manage Web Site styles.

In addition to the Web Site Database components, the Web Site further includes several other features to improve information retrieval, including search, quickpicks, news and announcements, and interest lists features. The basic search finds all available items that contain the specified words in the title, description, or keyboard list. In addition, an advanced search feature limits the search to a specific folder, category, perspective, author, or to recently created items. A quickpick is an item display option that provides quick access to frequently used items. Links to quick pick items are displayed at the top of the page. For the travel Web Site example, quickpicks may include a currency converter and travel guide. News and announcements are item display options that identify items of particular and current interest. In one embodiment, links to news items are displayed under a special news banner. Links to announcement items are displayed in the center the page under the quick picks. Users logged onto a Web Site may add folders to their interest list. In one embodiment, links to the folders are displayed under an interest banner on a home page for that user. This provides quick access to the areas of the Web Site that most interest the user.

Figure 2:
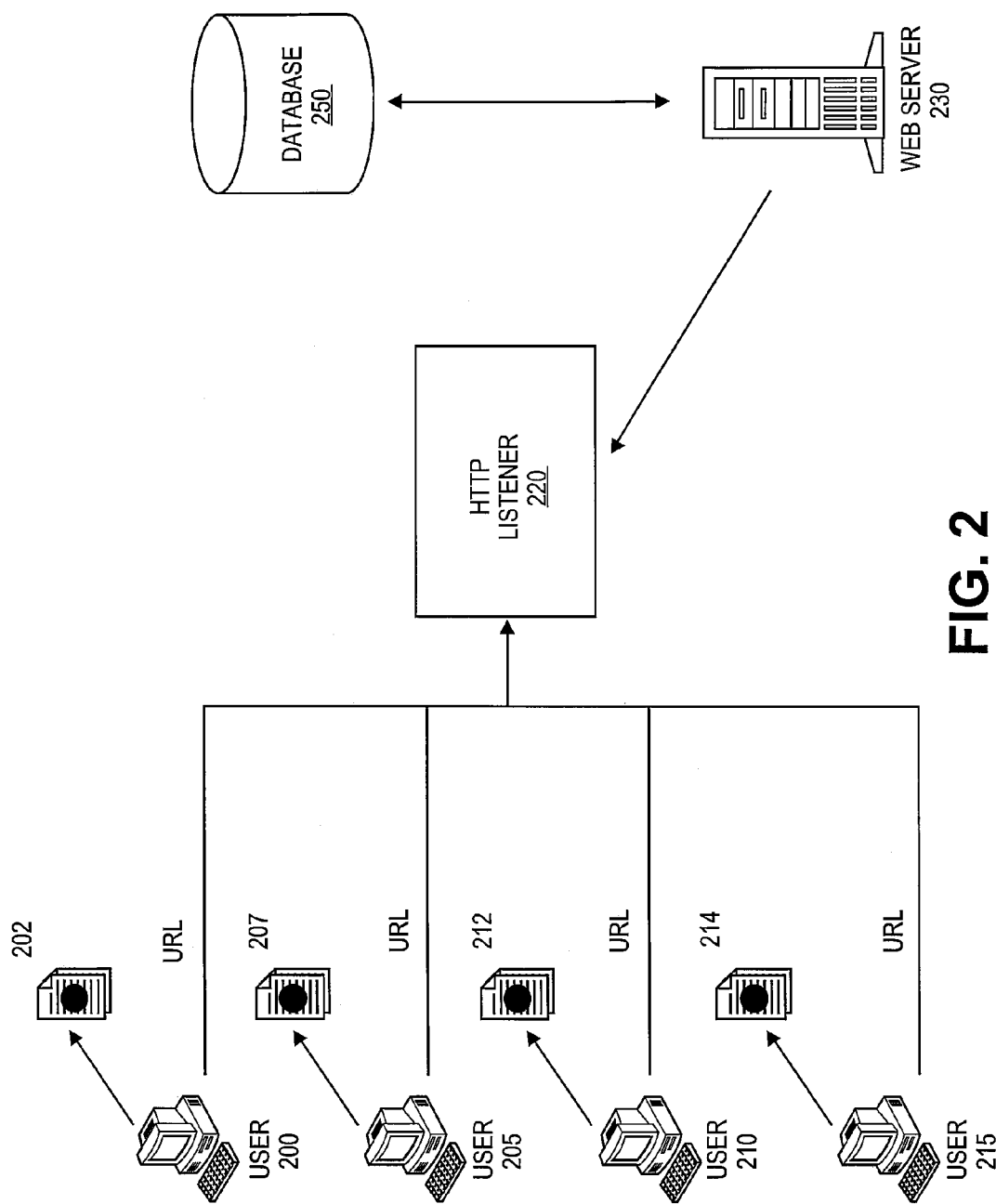
FIG. 2 is a block diagram illustrating one embodiment for the Web Site Database system.

FIG. 2 is a block diagram illustrating one embodiment for the implementation of the Web Site Database. For this embodiment, the Web Site is maintained on a database, database 250. In turn, database 250 is implemented on web server 230. The users (i.e., content contributors and content viewers) use a plurality of computers, shown as desktop computers in FIG. 2 (e.g., 200, 205, 210 and 215). Each user is permitted to view Web pages of the Web Site (e.g., user 200 views web page 202, user 205 views web page 207, user 210 views web page 212, and user 215 views web page 214). For this embodiment, to view content from the Web Site, the users, from the user computers, only transmit a URL to the web server 230. The client computers need only run web browser software (e.g., Netscape navigator, Microsoft Explorer) to utilize the Web Site. No additional client software (i.e., software at the user computer) is necessary. Accordingly, the users have complete web site functionality through use of a web browser running on the user computer.

As shown in FIG. 2, the web server 230 runs software, depicted as HTTP listener 220. In general, HTTP Listener 220 is a server application that transforms URL identifiers for operation with the Web Site Database system. When the Web Site Database is installed, the database administrator may choose to install the Web Site Database HTTP listener. The HTTP listener is a lightweight web server that includes a PL/SQL gateway to enable communication between web browsers and the database. Once installation is complete, the database administrator may change the listener and the PL/SQL gateway settings at any time from within the Web Site. Accordingly, as shown in FIG. 2, users of the Web Site Database system do not require additional client software to utilize the Web Site Database system.

In one embodiment, the Web Site Database is contained entirely in a database (e.g., Oracle database 8i, available from or Oracle Corporation, Redwood Shores, Calif.). First, to initiate the process of building a Web Site, space is allocated on a computer for implementation of the database. In one embodiment, to accomplish this task, a database administrator uses a site creation wizard, part of the Web Site Development Tool, to allocate space for the database. Because the Web Site is contained entirely in a database, when the database is backed-up, the entire Web Site and all its contents are also backed-up. In addition, the Web Site Database is portable, such that moving the Web Site Database from one server to another is as easy as transporting the database from server to server.

When contributors add an item to the Web Site, the Web Site Database up loads the item, if necessary, to the database, and creates a link to the item on the appropriate folder page. In addition, if the item is a HTML file, the Web Site Database lists the supporting files (e.g., images) that are already available and require up loading. Using the Web Site Database, the folder page is automatically generated. The contributor does not require any knowledge of HTML to perform this process.

Figure 3:
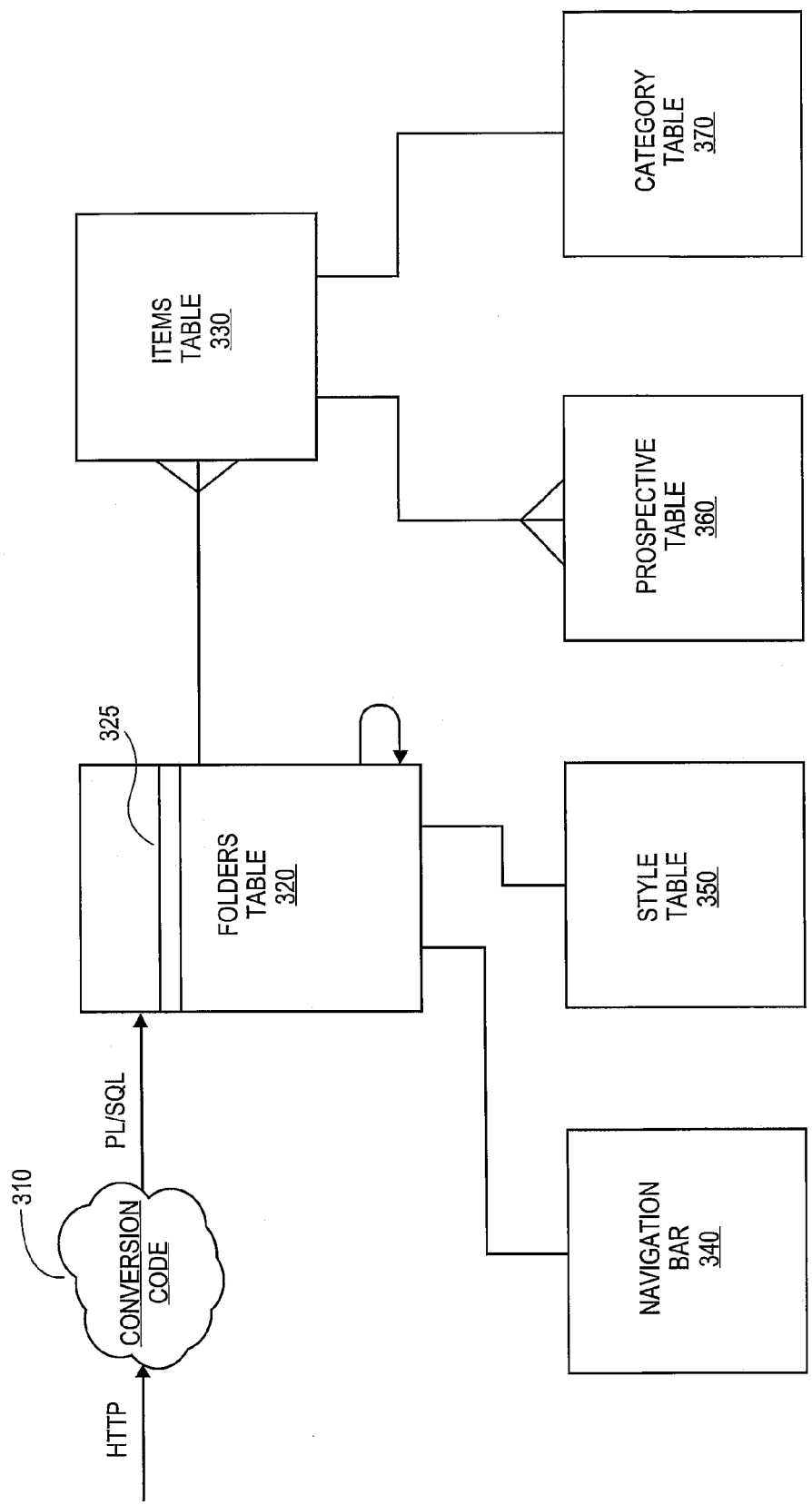
FIG. 3 is a block diagram illustrating one embodiment for implementing the Web Site Database system.

FIG. 3 is a block diagram illustrating one embodiment for implementing the Web Site database system. In general, FIG. 3 depicts a database schema for implementing the components of the Web Site Database system. Specifically, for this embodiment, the Web Site Database system includes a folder table 320, an items table 330, a navigation bar table 340, a style table 350, a perspective table 360, and a category table 370. Also, as shown in FIG. 3, conversion code 310 converts HTTP input from user computers to PL/SQL retrieve and stored procedures for operation in the database schema. For this embodiment, each folder comprises an entry (i.e., row source) in the folders table 320 (e.g., entry 325). As depicted in the folders table 320, folders are linked to sub folders, also contained in the folders table 320. There is a one to many relationship between an entry in the folders table 320 to entries in the items table 330. This relationship represents the one or more items contained in a single folder.

An item entry in the items table 330, representing items for the Web Site, has a one-to-many relationship with entries in the perspective table 360 and has a one-to-one relationship with an entry in the category table 370. Thus, an item entry may be assigned to one or more perspectives, and an item entry may be assigned to one category. As shown in FIG. 3, entries in the folders table 320 have a one-to-one relationship with entries in both the style table 350 and navigation bar table 340. The entries in the style table 350 define the style for the corresponding folder, and the entries of the navigation bar define the links on the navigation bar.

Figure 4:
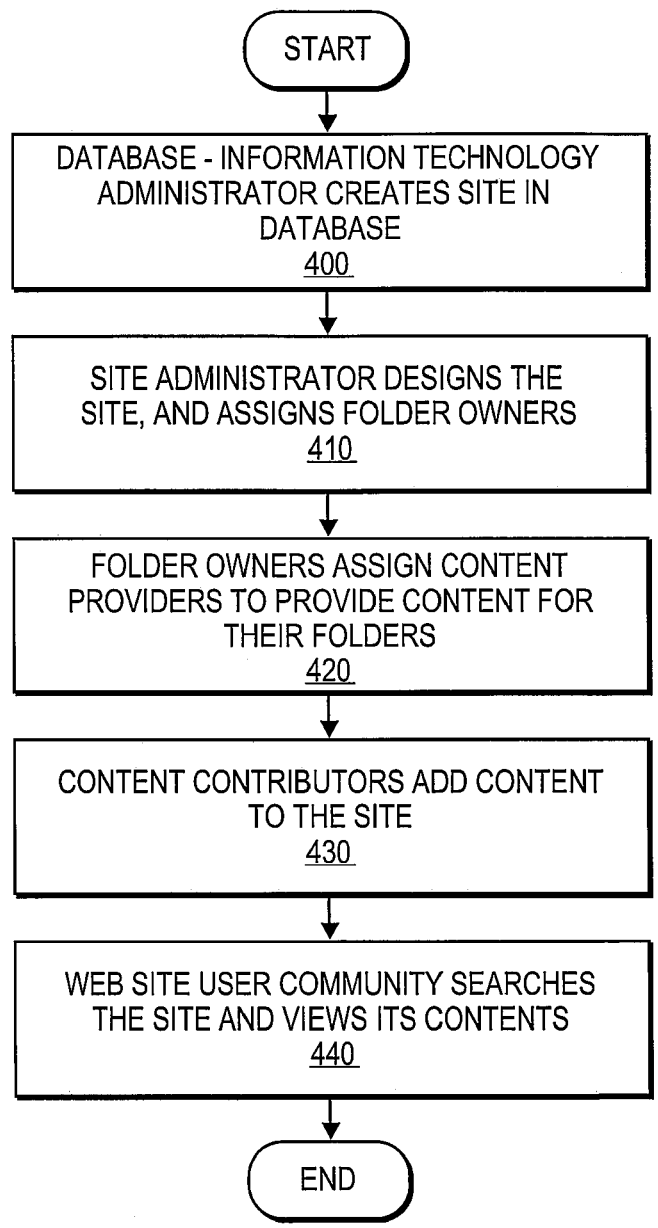
FIG. 4 is a flow diagram illustrating one embodiment for generating a Web Site using the Web Site Database system.

Designing the Overall Structure of the Web Site Database:

FIG. 4 is a flow diagram illustrating one embodiment for generating a Web Site using the Web Site Database system. First, the database administrator or information technology administrator creates a database (e.g., on a web server) for implementation of the Web Site Database system (block 400). The site administrator designs the Site, and assigns folder owners (block 410). Folder owners assign content providers to provide content for their folders (block 420). Then, content contributors add content to the Web Site (block 430). Thereafter, the Web Site user community may search the site and view, depending upon the viewer's privileges, the Web Site contents (block 440).

The Web Site Development Tool permits database administrators to create new users and manage existing user privileges all within the Web Site. Specifically, the Web Site Development Tool includes all the necessary features for managing database users such as: creating new users; creating levels and assigning users to those levels; granting privileges on database objects to users and levels; and granting user privileges to build objects and browse schemas.

During the Web Site creation process, a site administrator user account is created. When a site administrator logs onto the Web Site, the site administrator may design the initial parameters for the Web Site. This task includes: creating a style, creating folders, creating categories and creating perspectives.

The site administrator logs on to the Web Site database system by typing the administrator user name into the logon dialog box. In one embodiment, after logon, the Web Site database displays the sites administration page. FIG. 5 illustrates one embodiment for an administration page. As shown in FIG. 5, the administration page includes a section for web site managers, content managers, access managers, as well as a toolbox. In, the web site managers section, tools for "Site" and "style" are included. In the "Site" section, the site administrator may establish site wide features and settings; setup listener settings; control logs; system purges; and news. In the style section, the site administrator may create and manage styles to control frames, navigation bars, text, color and background images. The content managers section includes tools to manage "folders", "categories", "perspectives", and "custom item types." The folder manager permits the user to manage site structure and navigation, control access by users in groups, and apply styles to images and folders. The category tools permit the user to create and manage categories as well as associate categories with graphic images. The perspective tool permits the user to create and manage perspectives as well as establish their display choices. Custom item type tools permit the user to create custom item types and establish optional attributes and procedures.

The access managers section includes tools for "group", "user", "privilege", and "personal information." The group tools permit the user to create and manage groups as well as assign group administrators. The user tools permit a user to create and manage users, and assign administrator privileges to a single user. The privilege tools permit a user to assign administrator privileges to users, and the personal information tool permits the user to enter information for the user logged on. The toolbox section of the administration page includes functions for site statistics and search capabilities. The site statistics tool permits the user to produce and view online reports for site and folder page requests, searches, and user access privileges. The search pool permits a user to establish basic search features for search engines, as well as advance search features for text searches.

Figure 6:
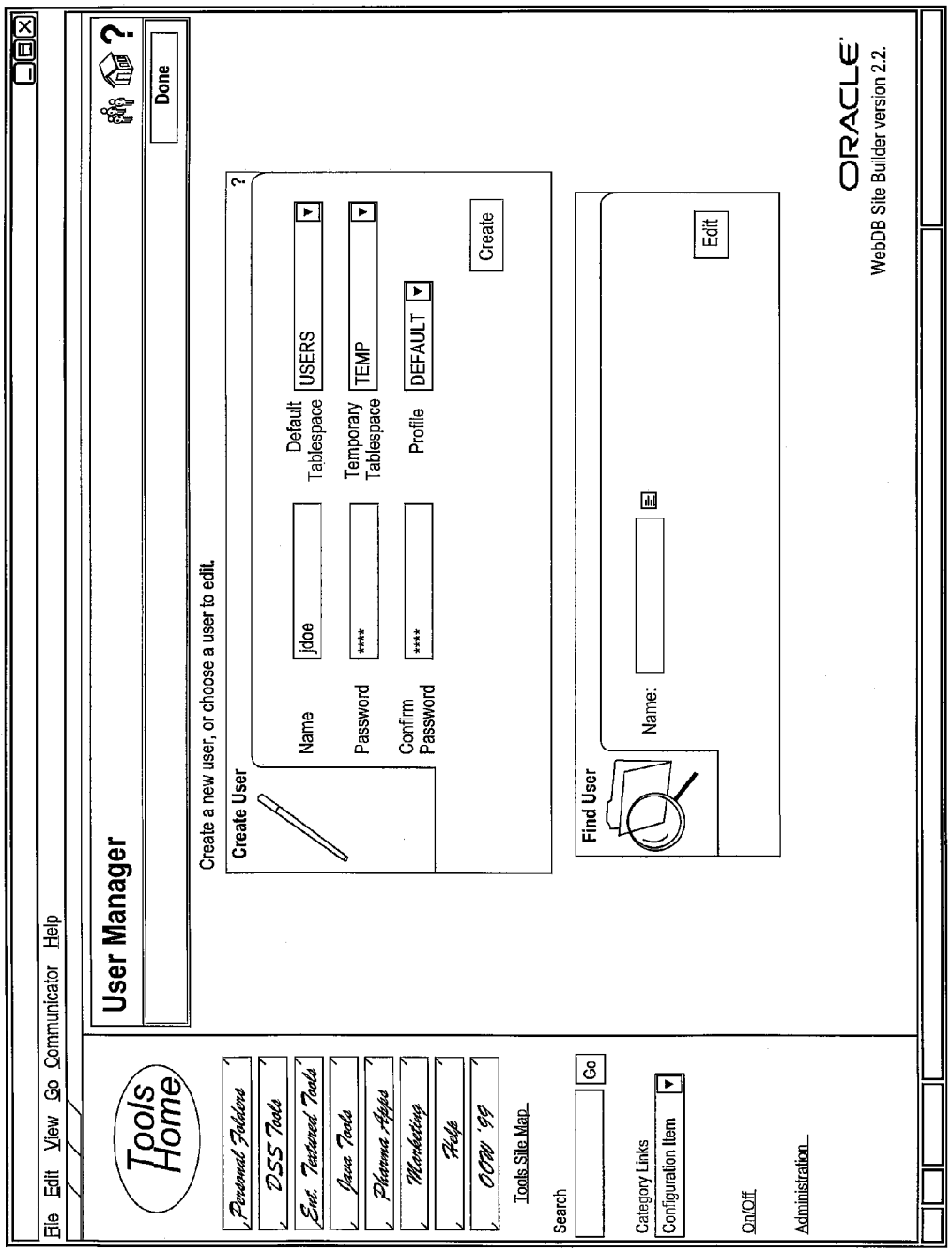
FIG. 6 illustrates one embodiment for the user manager.

From the access managers section, the user may click "user" to display the user manager. FIG. 6 illustrates one embodiment for the user manager. As shown in FIG. 6, the page displayed is divided into two panels. A "create user" panel permits a site administrator to create the user. The "find user" section permits searching for users. The user may desire to search for users assigned as site administrators. For example, the user may type "M %" to display user names that start with the letter M.

FIG. 7 illustrates one embodiment for a detailed user screen. As shown in FIG. 7, the user may set "administration privileges." In one embodiment, there are three types of administrators: site administrators, style administrators, and news administrators. Site administrators have the highest level of privileges in the Web Site Database system. Site administrators may view or modify anything on the site. For example, site administrators may create users, groups of users, and control access to the site. Site administrators may also perform all file and news administrator functions. Style administrators establish the look and feel of the Web Site. Style administrators have control over the color screens, text, fonts and background images for pages used on the Site. News administrators have the authority to add news to the home page, approved news submitted by public users, and perform other functions related to site wide news management.

Figure 8:
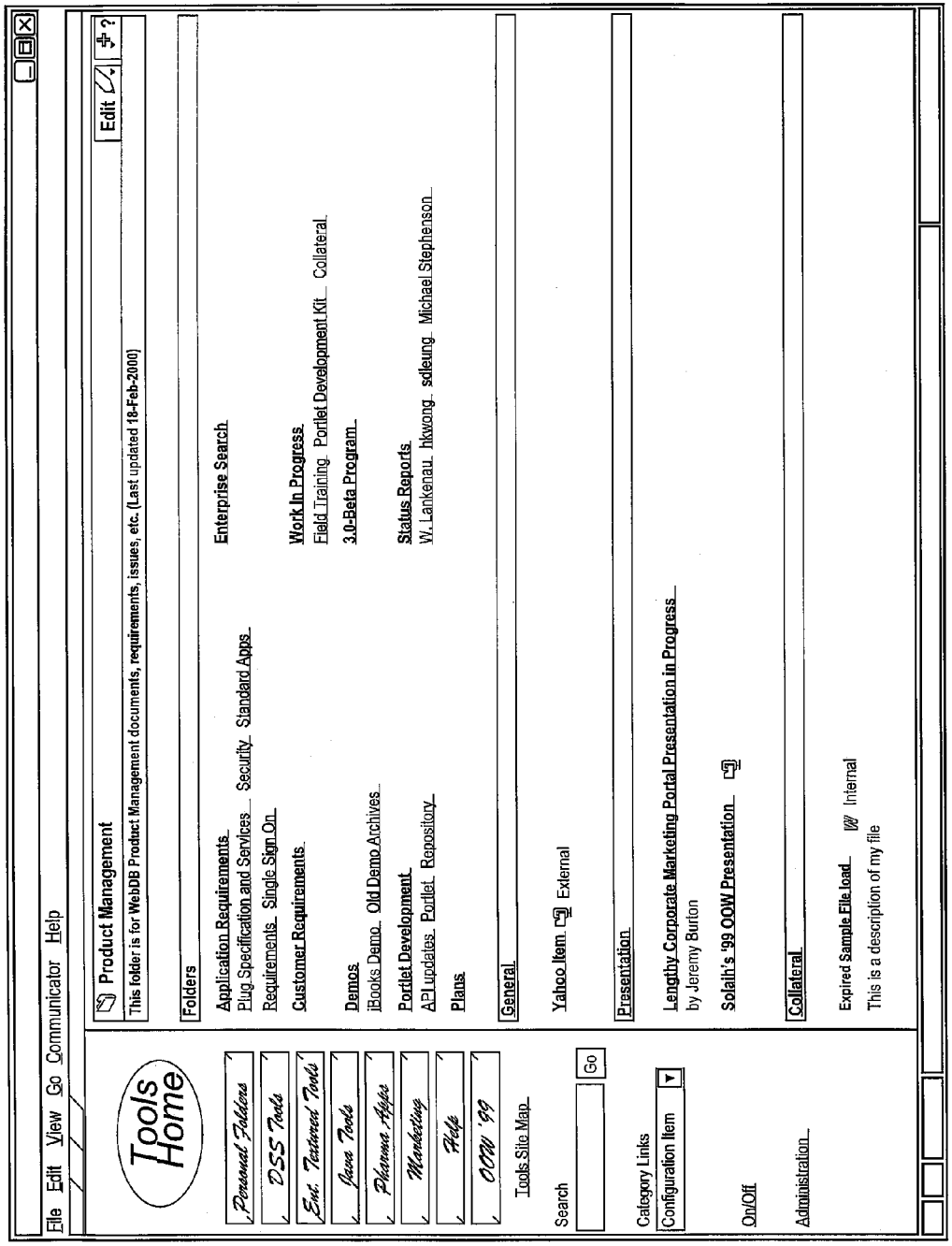
FIG. 8 illustrates an example Web Site home page using the Web Site Database system.

Overview of the Web Site Database Embodiments:

FIG. 8 illustrates an example Web Site home page using the Web Site Database system. This example Web Site is displayed in view mode. This example display shows a "product management" folder for storing and organizing product management documents, requirements, issues, etc. The product management folder includes categories for "general", "presentation", and "collateral." Under each of the categories, there is one or more sub folders. For this example, sub folders exist for "application requirements", "customer requirements", "demos", "portal development", "plans", "enterprise search", "work in progress", and "status reports." As shown in FIG. 8, items may be displayed beneath the sub folders.

In addition to categories and folders, the example Web Site displayed in FIG. 8 also includes perspectives. For this example, a perspective for "external" and a perspective for "internal" exist. Specifically, the item "Yahoo Item" is assigned to the perspective "external", and the item "sample file load" is assigned to the perspective "internal."

Figure 9:
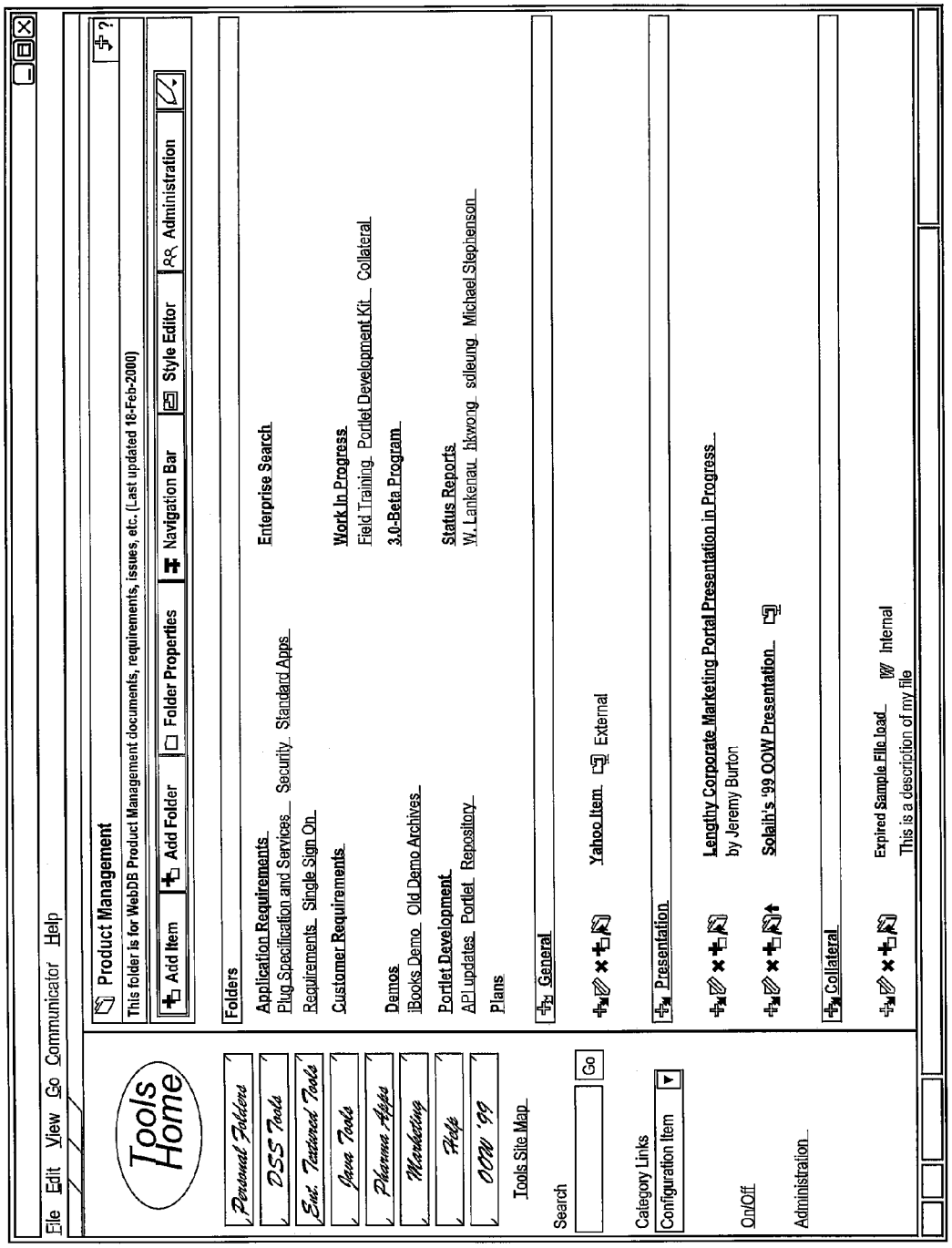
FIG. 9 illustrates one embodiment for the example web site home page of FIG. 8 in edit mode.

To transition from view mode to edit mode, a user selects the "edit" icon displayed in the upper right in corner of FIG. 8. FIG. 9 illustrates one embodiment for the example web site home page of FIG. 8 in edit mode. As shown in FIG. 9, a display bar, including several functions, is displayed at the top of the screen. Specifically, functions are provided to "Add Item", "Add Folder", "Folder Property", "Navigation Bar", "Style Editor", and "Administration." A description of these functions is provided below.

1. Items of the Web Site Database:

In general, items are the information building blocks on the Web Site Database. All content on the Web Site Database, such as text, graphics, or links, are added as items. When an item is added, the Web Site Database permits the user to specify its title, display option, and optional information about the item. An item type defines the display and functional characteristics of items that a contributor adds to a Web Site Database. When adding items, the user selects from one of the item types. When selected, the URL item type adds a URL to a folder. The title of each URL item is displayed as a link that users can select to view another Web Site or Web page. For a file item type, the Web Site Development Tool up loads a file and stores it in the database of the Web Site.

Each file item title is displayed as a link. Users may click the link to view the file or download the file to their computer. For a text item type, the Web Site Development Tool places text (up to 32 KB) on the database of the Web Site. When the text item is added to a folder, the items title is displayed on the folders page as a link that users may click to display the text. For an image map item type, the Web Site Database inserts an image map, with clickable regions and associated URLs on the Web Site. To add a folder link item type, the Web Site Database places the link to a folder on the Web Site.

For a Web Site component, the Web Site Development Tool adds a Web Site component such as forms, menus, frame drivers, and reports to the Web Site. In one embodiment, these components are created with a Web Site component builder and an appropriate build wizard. The title of each Web Site component item is displayed as a link that users may click to execute the component. For a "PL/SQL" call item type, the Web Site Development Tool displays the results of some "PL/SQL" code. The title of each "PL/SQL" call is displayed as a link that users click to execute. For the multiple files item type, the Web Site Development Tool up loads multiple separately independent files into a specific folder. The title of each multiple file item is displayed as a link that users may click to view the files or download them to their computer.

In one embodiment, the Web Site Database provides an assortment of default item types. For this embodiment, the item types include: file, text item, URL, folder link, PL/SQL call, web site database component, and image map. Once users identify the item type, they are provided a list of attributes to define that item. Table 1 below lists attributes that are available in an example web site database default item type.

TABLE 1

| Attribute | File Item | Text Item | URL Item | Folder Link | PL/SQL Call | Component | Image Map |
|---|---|---|---|---|---|---|---|
| Name | X | | | | | | |
| Title | X | X | X | X | X | X | X |
| Description | X | X | X | X | X | X | X |
| Category | X | X | X | X | X | X | X |
| Perspectives (multiple) | X | X | X | X | X | X | X |
| Author | X | X | X | X | X | X | X |
| Expiration Date | X | X | X | X | X | X | X |
| Image | X | X | X | X | X | X | X |
| Rollover Image | X | X | X | | | | |
| Keywords | X | X | X | X | X | X | X |
| Display In Place | | X | | | X | X | |
| Display In Frame | | X | | | X | X | |
| Display In Full Browser | X | X | X | X | X | X | |
| Enable Check Out | X | X | X | X | X | X | X |

The web site database default item types are limited to the default attributes assigned to them. If the user desires to append additional attributes to a default item type, then an extended item type is created. When creating an extended item type, the default item type is copied, along with its related attributes. Then, a user may extend the copied item type by adding attributes that the user creates. Extended item types may be used to collect additional information via the items attributes.

In one embodiment, in addition to the standard item types, the Web Site Database also supports creating custom item types. Custom item types enabled the user to customize the existing item types to make them map more specifically to the items included in the Web Site. For example, a custom item type may enable the user to add notes about a text item and to specify a string to pass to a search engine.

2. Categories in the Web Site Database:

In general, a category is a classification for an item that answers the question "what is this item?" Categories are used by end users of the Web Site Database to filter information. The site administrator may create categories specifically for the different types of content that is planned for display using the Web Site Development Tool. In one embodiment, only regular items are assigned a category (categories are not available for news, announcement or quick to pick items). By organizing items in categories, the content provider presents to end users of the Web Site Database a clear understanding of the types of content they may expect on the Web Site, and a general understanding of how to Web Site is organized. Using categories, the end user may view items by category. In addition, end-users may specify categories when they perform an advanced search in the Web Site Database. For the example travel Web Site discussed above, there may be categories for "maps", "excursions", and "hotel reviews." In one embodiment, items associated with categories are alphabetically organized and displayed on a folder page by item name.

3. Folders in the Web Site Database:

As discussed above, to perform any folder tasks, the user or group must have the appropriate folder privileges set by the folder owner or site administrator. In general, a folder is a collection of related objects, including items and even other folders. For the example travel Web Site, folders may exist for "Africa", "America's", and "Europe." Folders are the basic building blocks of the Web Site Database. All Web Site Database sites consist of folders. The folders, in turn, contain content or items. For example, the items accessible within a folder may include text files, graphical images, and even URLs for other related sites. To further refine the Web Site's structure, the creator may generate folders within folders (i.e., sub folders). Sub folders may be nested many levels deep depending upon the complexity of the content and broadness of the audience.

In one embodiment, the Web Site's home page is actually the Web Site database's root folder. Each folder has a navigation bar from which the user can navigate to other folders in areas on the web site. Each folder also has a content area in which the folder's content appears. Dividing a Web Site into folders allows the Web Site creator to organize content according to a structure similar to that of a file system on a personal computer. Thus, this paradigm makes it easier for users to find the information they need.

Each folder has a folder owner. The folder owner is responsible for the content of that folder. Dedicating responsibility to each folder results in a system that is maintained by somebody who's familiar with the information and who's able to keep the information accurate and up-to-date. Site administrators may create folders anywhere in the Web Site. A folder owner may create folders within the folders that they own. A folder owner may make folders containing general information accessible to anyone that reviews the Web Site. Alternatively, the folder owner may restrict access to folders containing sensitive information to specific users who must first logon to the Web Site.

After creating a folder or editing a folder, the folder owner permits a user to configure and control the behavior and functionality of a particular folder. In one embodiment, there are six folder properties that contain specific folder configuration settings. In one embodiment, these configuration settings are presented to the user in the form of tabs. A "main" tab identifies the folder to users, makes folders available to public users, and provides options to set the display order for the subfolders. The "style" tab lets the user customize the folder's style for the navigation bar, banner, and content area. If the style for the folder is not set, then the folder inherits the parent folders style. An "image" tab lets the user choose the folder image and overall image for the navigation bar, as well as the banner image for the page title. The "navigation bar" tab permits the user to choose the navigation bar to apply to the folder. The navigation bar also lets the user select specific folder, category, and perspective links. The "users" tab provides a mechanism to grant folder privileges to users. Also, the "groups" tab provides a mechanism to grant folder privileges to groups.

4. Styles in Web Site Database

In general, a style is a template that controls the look and feel of the home page and each folder page on the Web Site. In one embodiment, the style template governs the navigation bar and page body, colors, text font, size, background images, banners, and other graphic elements that are common to each page. With the Web Site Database, the user does not control the detailed layout of each page; instead, the pages are dynamically generated by the Web Site Database, based on the settings and parameters specified in the style template. The Web Site Database provides a default style. In addition, the user may generate custom styles to suit particular needs. A single style may be chosen for the entire Web Site (e.g., the home page and each folder). Alternatively, the user may assign different styles to give each folder a distinct look and feel.

5. Perspectives in the Web Site Database

A perspective is a cross category grouping of an item. By assigning a perspective, the Web Site creator is answering the question "who will be interested in this item?" For the example travel Web Site, perspectives may include "Vacations for Nordic Enthusiasts", "Archaeology Expeditions", "Extreme Vacations for Adventurers", etc. In one embodiment, the Web Site Database includes a perspective manager. The perspective manager allows users to create perspectives for items that potentially interest the audience.

When a user adds or edits an item, they have the option of assigning one or more perspectives to that item. Unlike categories, the user is not required to assign perspectives to an item. However, when perspectives are assigned, they may be used by end users of the Web Site to filter information. Specifically, end users of the Web Site may view items by perspective and may also specify perspectives when they perform an advanced search. Perspectives are available for regular items.

The Web Site Database permits the user to associate an icon with a perspective. If an icon is associated with a perspective, the perspective icon is displayed next to the item's title. The Web Site Database also permits a user to change a perspective's name and icon. The content manager also permits a user to delete a perspective. Unlike categories, the user may delete a perspective without the deleting the items assigned to that perspective.

6. Groups in the Web Site Database

A group is a collection of users that share a common interest or responsibility. A group has common privileges in the Web Site. For an example corporate Intranet application, all graphical designers at the company may be designated as a single group. This group of graphic designers may be designated as style administrators. Any end-user may create a group. The person who creates the group is considered a group owner, and the group owner designates one or more group administrators. As the creator of the group, the group owner has the authority to modify or delete the group. The group administrator also has the authority to modify or delete the group.

Figure 10:
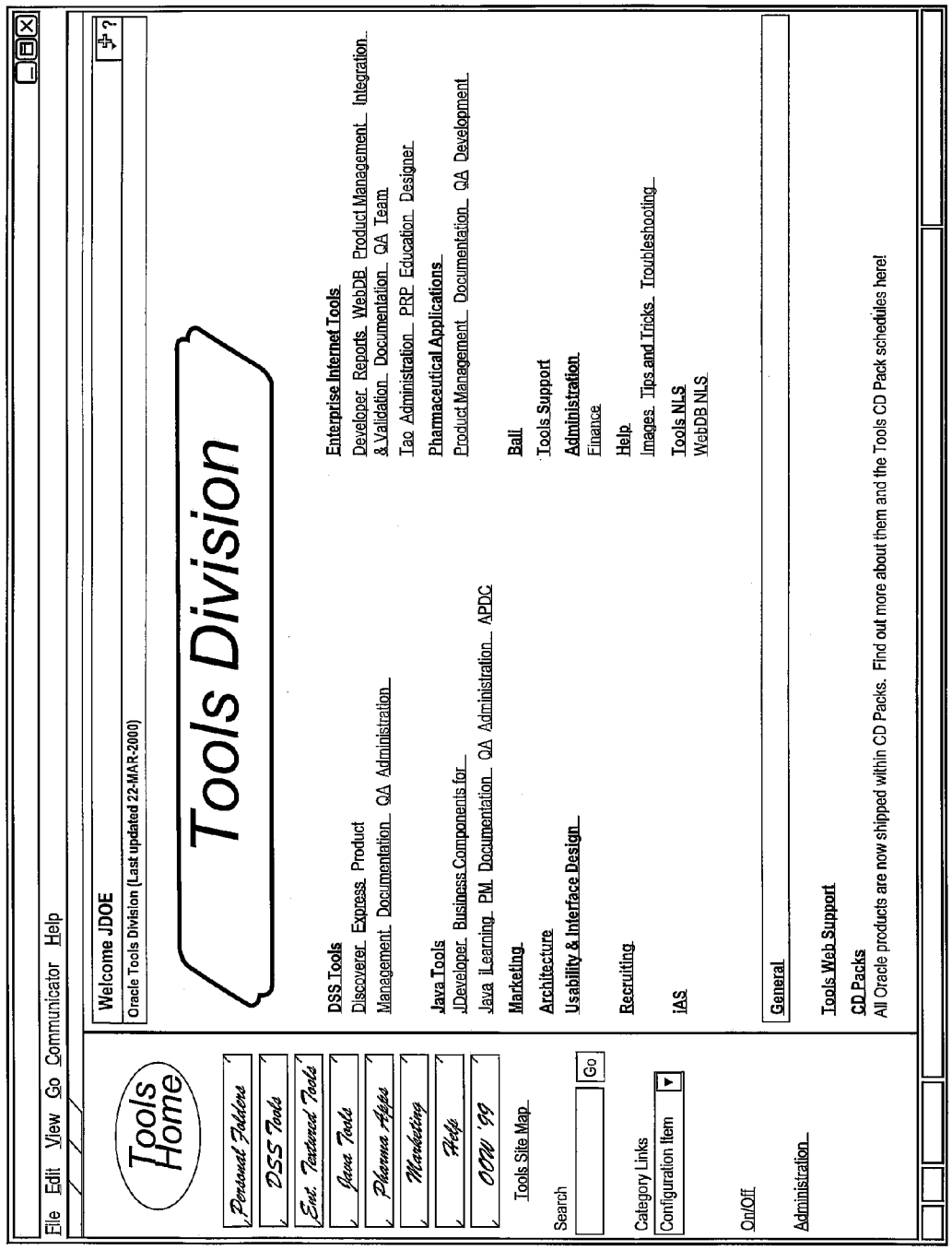
FIG. 10 illustrates an example logon welcome screen.

Self-Service Web Site Creation & Maintenance:

Initially, the user logs onto the system with a user login dialog box. The dialog box queries the user for the user name and the user password. After successful logon, the Web Site Database system displays an initial welcome screen in a predetermined root folder. An example logon welcome screen is displayed in FIG. 10.

Figure 11:
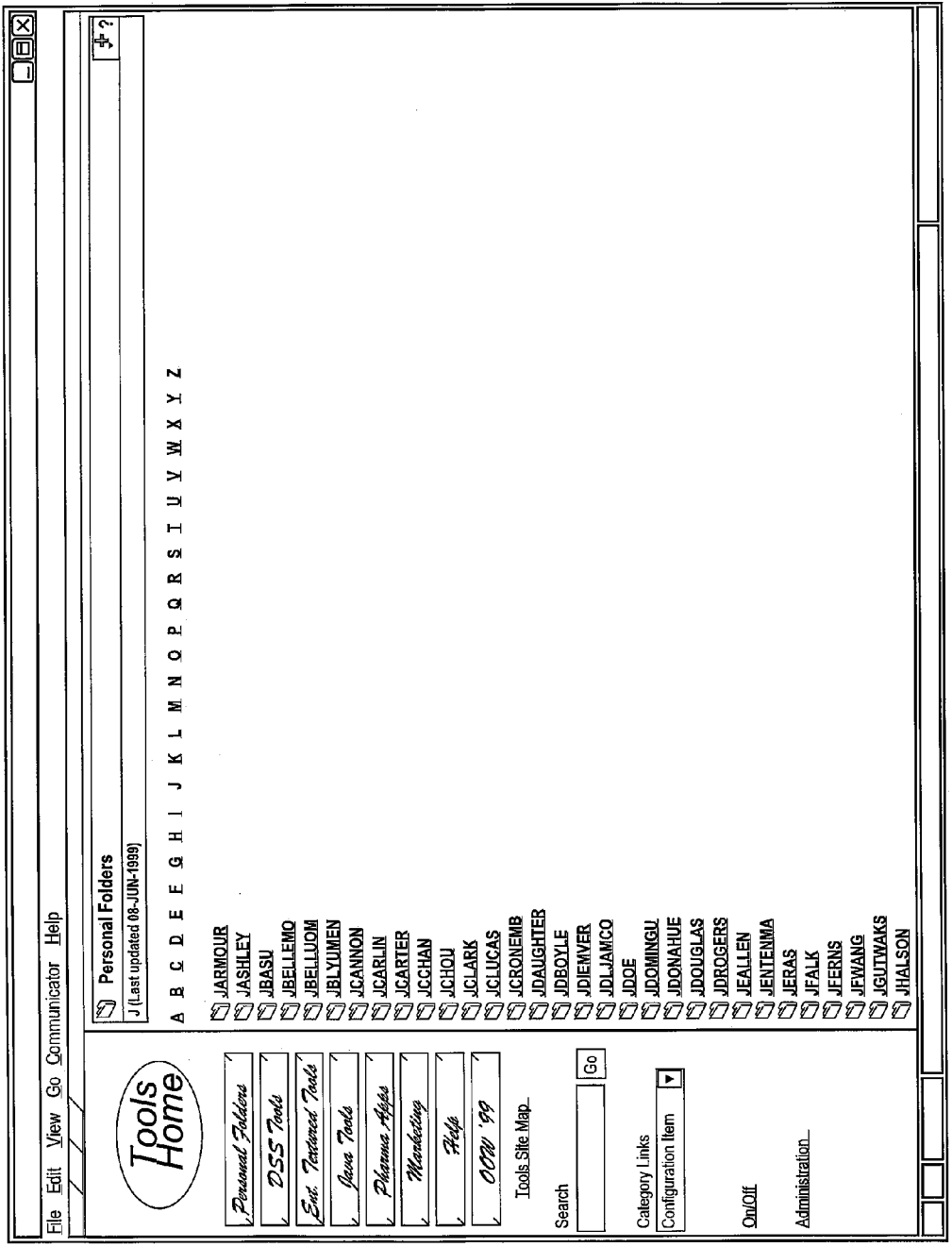
FIG. 11 illustrates one embodiment for displaying personal folders for the Web Site database system.

The Web Site Database permits the sharing of information among users in the Web Site. In one embodiment, to share information among users, each Web Site user with a user name and password has an associated personal folder. FIG. 11 illustrates one embodiment for displaying personal folders for the Web Site database system. As shown in FIG. 11, an alphabetical directory is provided at the top of the screen to permit a user to jump to folders with the corresponding letter. Also, as shown in FIG. 11, a personal folder is created for each registered user of the Web Site Database system. Users may work within these personal folders. Specifically, the user may add items, organize items by creating other folders, and control access to their personal folders. This provides an ideal environment for sharing information among registered users at a Web Site. No floppy disks or electronic mail is needed, and everyone always has access to the latest versions of the content.

In one embodiment, the Web Site Database includes an interface for adding new items (e.g., the files, text and URLs) to the Web Site. In addition, this interface permits the user, with the proper privileges, to edit or to delete existing items within the Web Site itself. When contributors logon to the Web Site and navigate to a folder where the user has the appropriate privileges to edit, the user may simply click the edit button and start editing and adding content.

1. Adding Items

In one embodiment, the Web Site Database includes item management tools to manage items. The item management tools are displayed in edit mode. The user may move the cursor control device of the computer over a tool to display its tool tip. An "add sub item" management tool, when invoked, displays the item wizard to add a sub item to the selected item. An "add an item below this item" tool displays the item wizard to add a new item after the selected item. An "edit item" tool displays the item manager to allow the user to change the required or optional item settings. A "delete item" tool removes the item from the folder, and an "expire item" tool causes the selected item to expire. When expired, the item is no longer visible to the user. A "move item" tool displays the move item page. This tool permits the user to move the item to another location in the same folder or to move the item to another folder completely. The "move item up" tool automatically moves the selected item above the previous item. The "move item left" permits the user to move quickpick items to the left.

The "check out item" tool applies only to items enabled for check out. When an item is checked out, no other contributor may edit the item. If another contributor attempts to edit the item, a message is displayed that the item is checked out by "username", and the edit tool is not available. A "checked-in item" tool permits a contributor to return the updated item to the folder after editing it. This tool applies only to items that have been checked out and that were enabled for checked out. The "multiple files item" function indicates that the item has multiple referenced files associated with it. The "multiple files missing file item" function indicates that the item is missing one or more referenced files. The user may click to display a multiple item page so that the user may download the missing files. An "approve item" tool displays on the news administrator's, site administrator's or folder owner's home page for a user's request for approval of an item. The approve item icon is displayed only for items that are added by contributors who have the "create with approval privilege." A task help function displays task based help that includes how to topics, table of contents, index, and full text search capabilities. A context help function displays context sensitive help for the current page.

Figure 12:
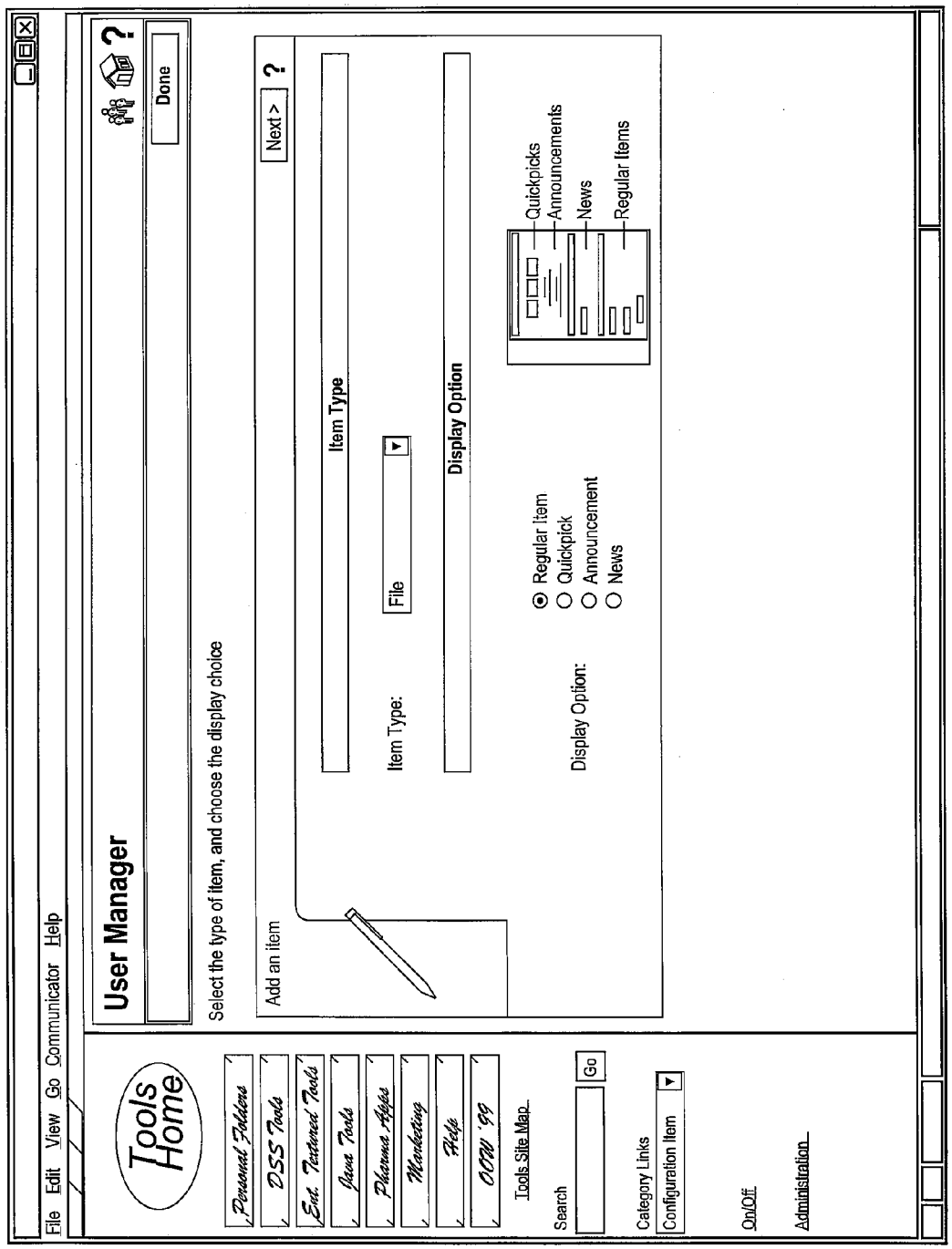
FIG. 12 illustrates one screen for an item wizard to "Add an Item."

FIG. 12 illustrates one screen for an item Wizard to "Add an Item." The first step of the Wizard includes specifying an item type and display options. The user may select an item type from an item type list as shown in FIG. 12. For this example, the item type selected is a file. In one embodiment, the Web Site Database includes item display options to permit a user to select where the item will be located on a rendered Web page. FIG. 12 displays, on the item wizard, an example Web page showing where items may appear. The vertical bar in the left frame is the navigation bar. The entire area in the right frame refers to the content area. The strip in the right frame is the title banner.

As shown in FIG. 12, the web page includes areas for Quickpicks, Announcements, News and Regular items. In general, the quickpick display provides access to high visibility items. Quickpicks are the most prominent items on a folder page. For this embodiment, Quickpicks are displayed at the center and top of each folder page. Also, as shown in FIG. 12, Announcements are displayed directly below any Quickpicks to receive immediate attention by the web page viewer. The Announcement text is centered and stacked vertically on the home or folder page by title. An announcement item is used to introduce information to the general public. For example, one may announce the appointment of the member of the board or the date of an important corporate event. A News item is used to categorize time sensitive items. In one embodiment, the News items are displayed as text links by title under the news banner on each folder page. Public users may add News items to the root folder as long as the site administrator has checked the "enabled public users to contribute news" feature. A regular item, displayed below the News items, receives no special display treatment. The title of each regular item is displayed along with all other regular items, below all the special banners. In one embodiment, regular items are displayed under a category banner grouped by category (in alphabetical order).

Figure 13:
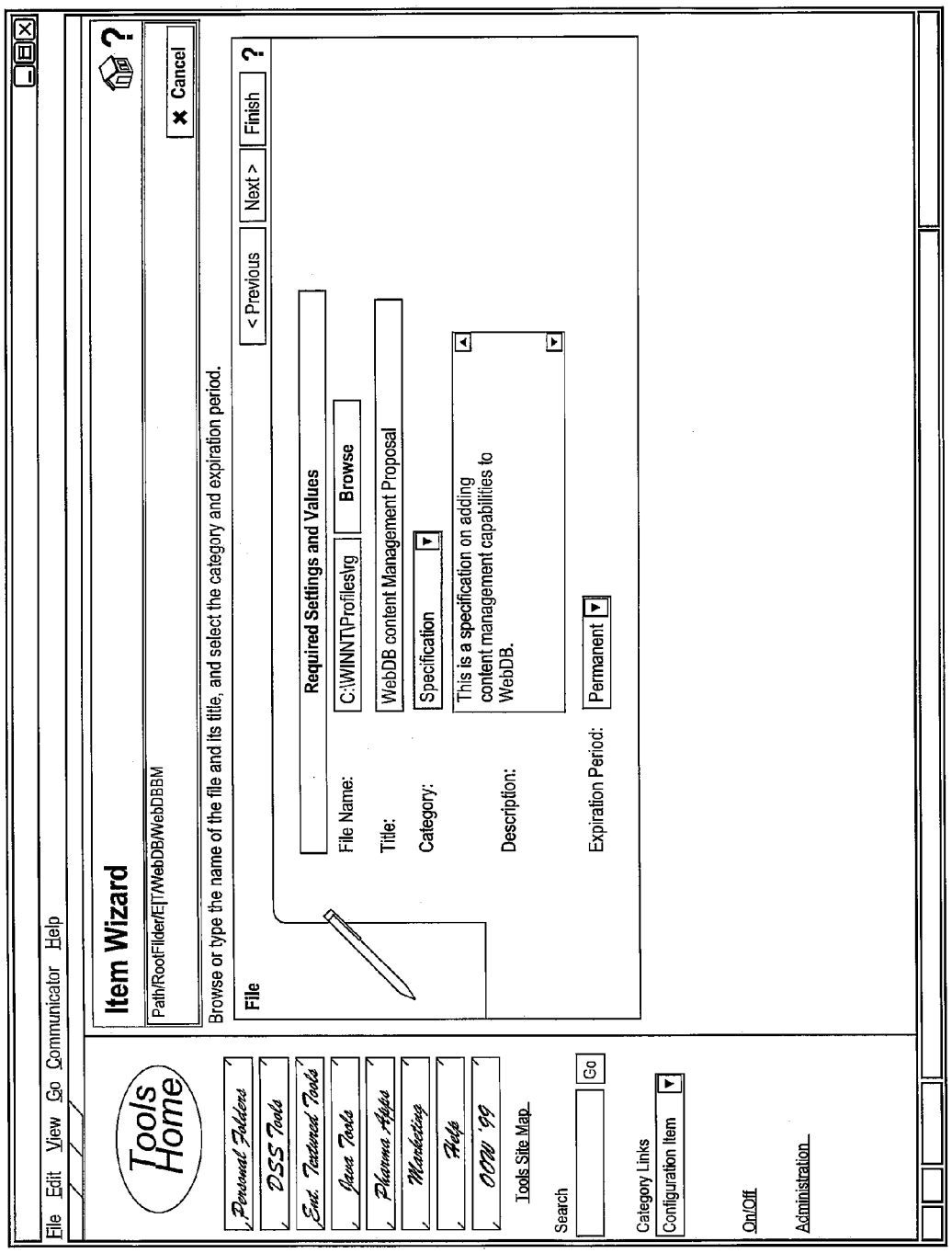
FIG. 13 illustrates a screen for a second step in the item Wizard in accordance with one embodiment of the Web Site Database System.

FIG. 13 illustrates a screen for a second step in the item Wizard in accordance with one embodiment. For this step, the user, through the item Wizard, specifies the filename (with path), title, category, a description, if preferred, and an expiration period. A browse button is provided to assist the user in locating a directory and file. The user selects the category through the category list. For the example of FIG. 13, the user selects the category "specification." Also, for this example, the user provides a description of the item (i.e., this is a specification on adding content management capabilities to WebDB."). The expiration period is set by selecting from options in the list. For this example, the user designates the item as "permanent."

Figure 14:
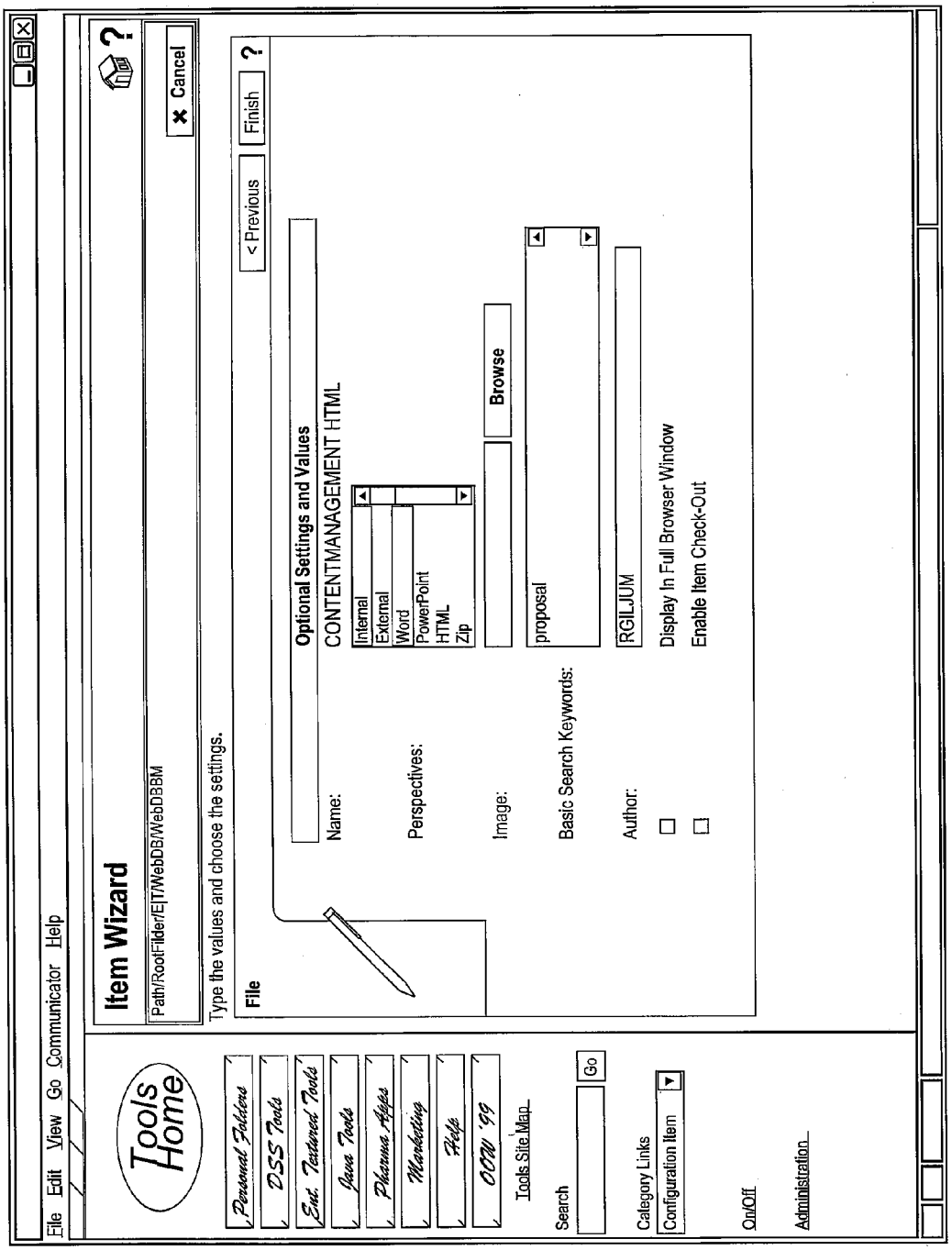
FIG. 14 illustrates a screen for a third step in the item Wizard in accordance with one embodiment of the Web Site Database System.

FIG. 14 illustrates a screen for a third step in the item Wizard in accordance with one embodiment of the Web Site Database system. This step permits a user to submit optional settings and values. Specifically, the user may select from a list of predefined perspectives (e.g., internal, external, word, PowerPoint, HTML, zip, etc.). From this step of the item Wizard, the user may associate an image with the item. Furthermore, the user may add keywords for searching, and author information, as well as designate display options and enable item check out.

Figure 15:
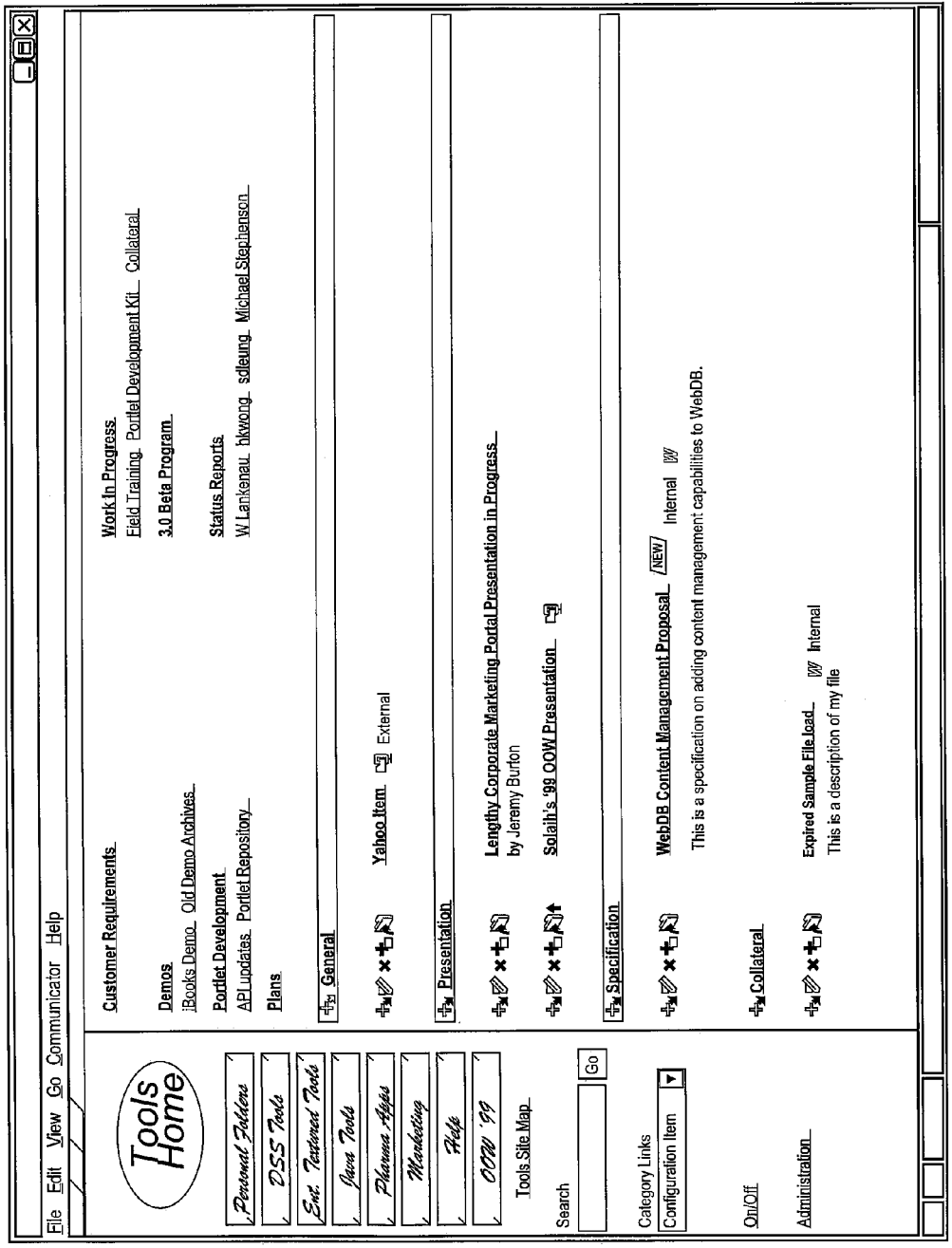
FIG. 15 illustrates an example Web Site screen display after adding the item.

FIG. 15 illustrates an example Web Site screen display after adding the item. Specifically, as shown in FIG. 15, the item "WebDB content management proposal" was added to the "specification" category with the perspective "internal." Also, the description provided from the Wizard (e.g., this is a specification on adding content management capabilities to WebDB) is displayed beneath the link for selecting the item.

An item type defines the display and functional characteristics of items that a contributor adds to a Web Site. The user may create their own custom item types that enable them to customize the existing item types to make them map more specifically to the items in their Web Site. In one embodiment, only Site administrators may create custom item types. The following example illustrates the creation of a custom item type that enables users to add notes about a text item and to specify a string to pass to the search engine. In the navigation bar, the user clicks the administration icon to display the administration page. In the content manager section, the user clicks the "custom item type" to display the custom item type manager. In part, the Web Site Database system displays a create custom item type panel.

FIG. 16 illustrates one embodiment for a create custom item type panel. Using the create custom item type panel, a user types, in the name field, the type. For this example, from the base item type list, the user selects "file." In one embodiment, when the user first creates a custom item type, it is exactly the same as the base item type. The user then edits the custom item type to customize it to meet the specific requirements. The user then clicks "create." Similarly, in the custom item type manager, the user may create more custom item types as well as find and edit existing custom item types.

Figure 17:
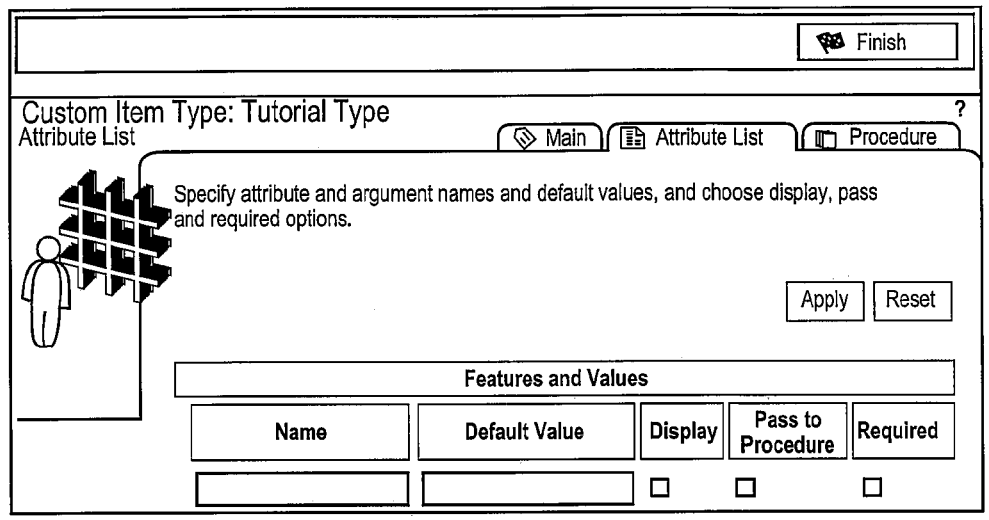
FIG. 17 illustrates one embodiment for specifying attributes in a custom item type.

FIG. 17 illustrates one embodiment for specifying attributes in a custom item type. As shown in FIG. 17, the user may use custom item type attributes to enable contributors to add more information about an item or specify values to pass to a PL/SQL or HTTP procedure. A user is permitted to specify, under the features and values section, a name, default value, display control, pass procedure control and a control as to whether the attribute is required.

Figure 18:
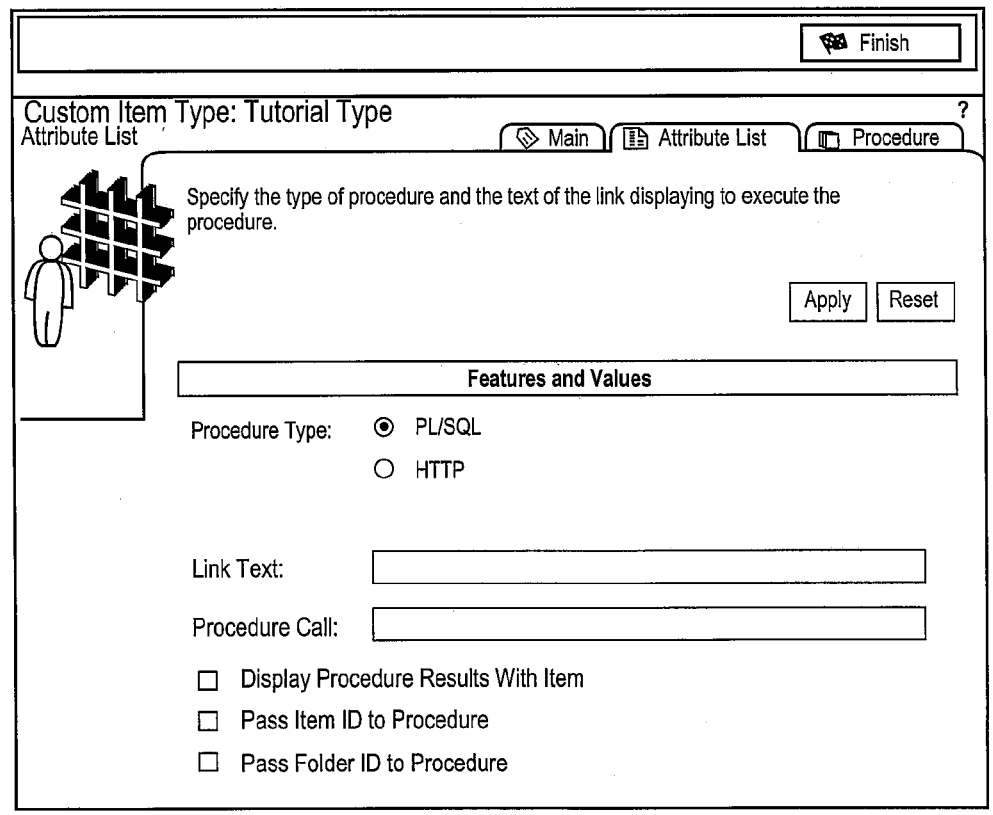
FIG. 18 illustrates a screen for the user to specify the type of procedure and the text of the link display to execute the procedure.

FIG. 18 illustrates a screen for the user to specify the type of procedure and the text of the link display to execute the procedure. In the features and values section, the user specifies a procedure type. In the link text field, the user may specify that the text be displayed as a hypertext link next to the item title. When a user clicks the text, a call it is made to the procedure using the value specified in the "p" field when the item was added. The user may specify the procedure call in the procedure call field, as well as specify several conditions for execution of the procedure call.

Figure 19:
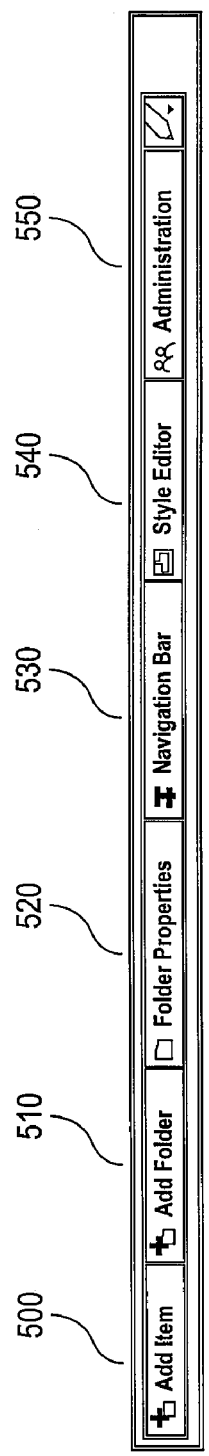
FIG. 19 illustrates one embodiment for a folder dashboard.

2. Creating and Editing Folders:

In one embodiment, the Web Site Database includes a folder dashboard. FIG. 19 illustrates one embodiment for a folder dashboard. In general, the dashboard is designed to provide quick and easy access to the main folder features. The folder dashboard appears below the folder title banner while the user is in edit mode. The add item icon 500 displays the item wizard to add an item to the folder. The add folder icon 510 displays the folder manager to create or edit folders. The folder properties 520 displays the folder manager from which the user may define or edit the folder properties. A navigation bar icon 530, when invoked, displays the folders navigation bar display properties. The style editor icon 540, when invoked, causes the Web Site Database to display the style editor. From the style editor, the user may edit the style for the folder or create a new style for the folder. The administration icon 550, when invoked, displays the main administration page from which the user may access the various administration tools. Finally, the view folder icon, when invoked, reverts to Web Site Database from edit mode to view mode.

The following example illustrates creation of a folder that contains content management information about a product offered by a company. In one embodiment, when the user logs onto the Web Site, the home page displays a list of folders owned by that user. After logon, the user scrolls down the home page and under the "Owned Folders" banner, clicks his/her name to display his/her personal folder. In the banner at the top of the page, the user clicks the "edit" icon to enter the edit mode. In response, the Web Site database system displays the folder dashboard. In the folder dashboard, the user clicks the "add folder" icon to display the folder manager. In part, the Web Site database system displays a create folder panel. To create a folder, the user navigates to a folder that is the parent folder of the new folder being created. For purposes of this illustration, a folder is contained in the main page the Web Site. The main page of the Web Site itself is a folder, entitled the root folder. Site administrators own the root folder.

Figure 20:
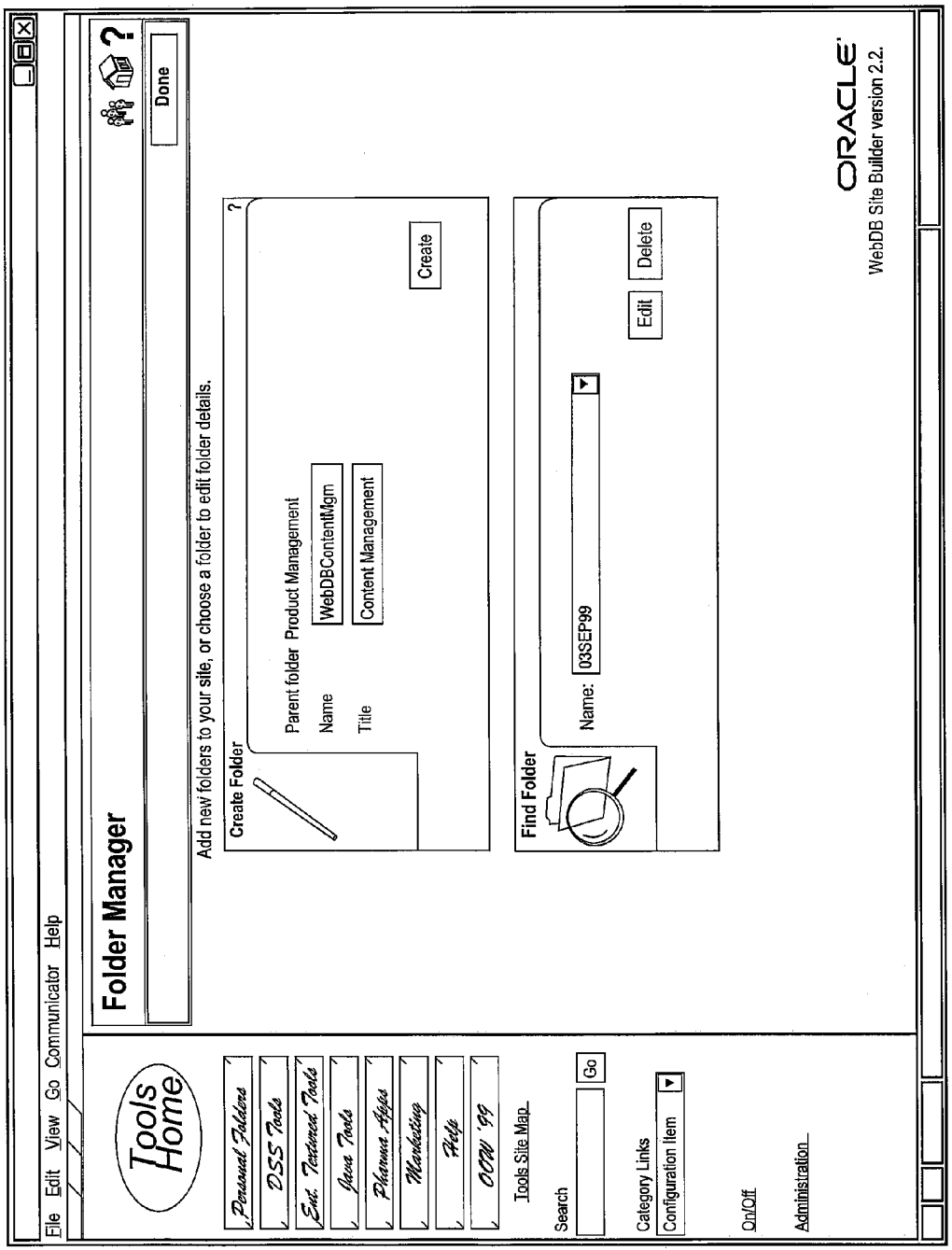
FIG. 20 illustrates one embodiment for a create folder panel.
Figure 21:
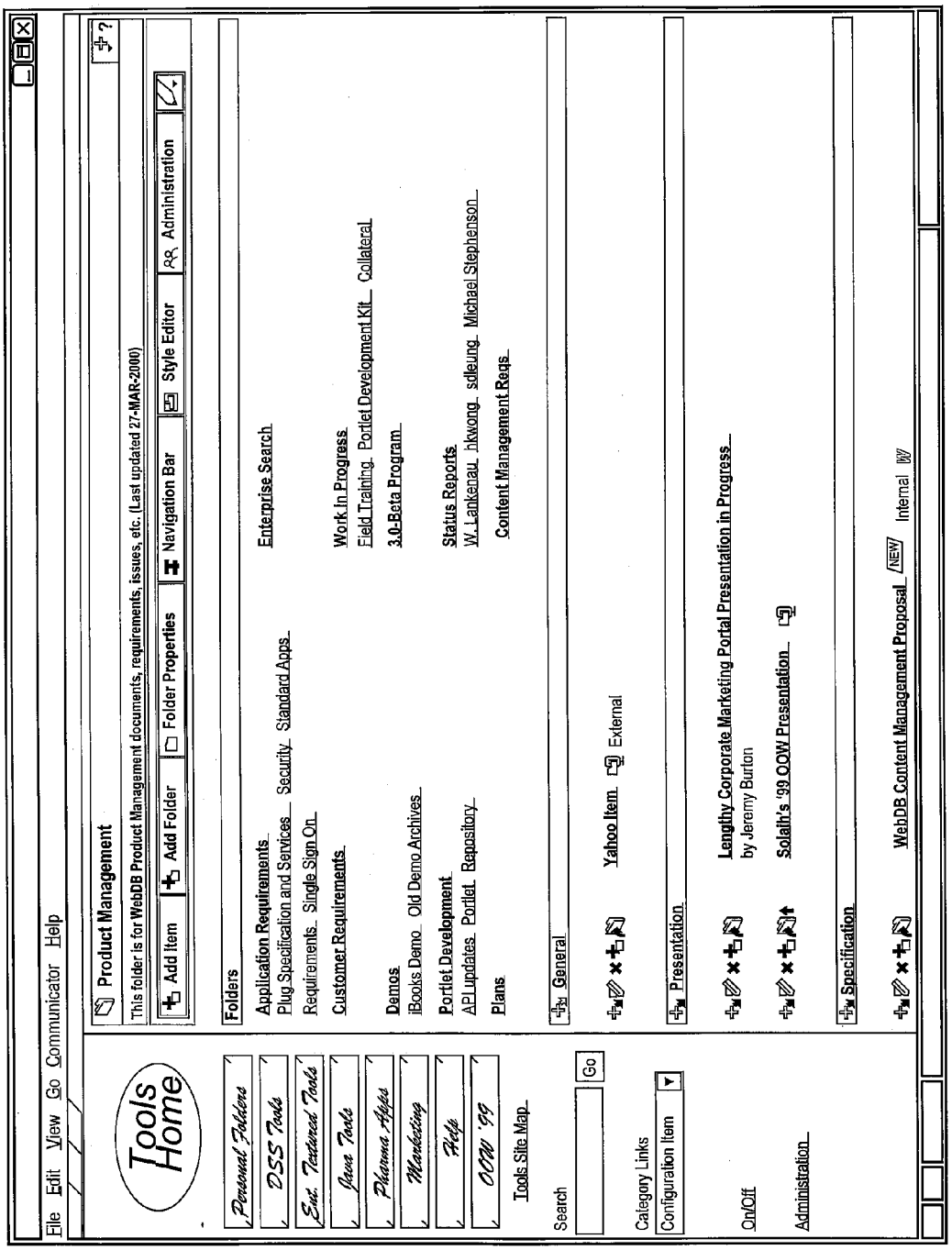
FIG. 21 illustrates an example Web Page for the new folder created.

FIG. 20 illustrates one embodiment for a create folder panel. For this example, in the name field, the user types "WebDBContentMgmt." In the title field, the user types a title for the folder, such as "Content Management Reqs." Thereafter, the user clicks the "create" button located on the create folder panel. From the toolbar, the user clicks the "done" icon. In response, the Web Site Database system creates a link between the root folder (i.e., main web page) and the Content Management Reqs folder. The user may view the Content Management Reqs folder as shown in FIG. 21.

In another embodiment, the user may create folders through the administration page. For this example, the user desires to create, in a "Products" folder, another folder that contains confidential information about products offered by the company. To accomplish this task, the user, from the navigation bar, clicks the administration icon to display the administration page. In the content manager section, the user clicks "folder" to display the folder manager tree. The folder manager tree lists all of the folders that the user has access privileges. The user then expands the "personal folders", and expands the first letter of the user name. The user then expands his/her personal folder. In the toolbar to the right of products, the user clicks an icon to display the folder manager. In the create folder panel, the user types, in the name field, "ConfidentialName." In the title field, the user types "Confidential." Then, the user clicks the create button to create the folder. At the top of the navigation bar, the user clicks the site logo to display the home page. The user may then scroll down the home page, and under the "Owned Folders" banner, click "Confidential" to display the confidential folder.

Figure 22:
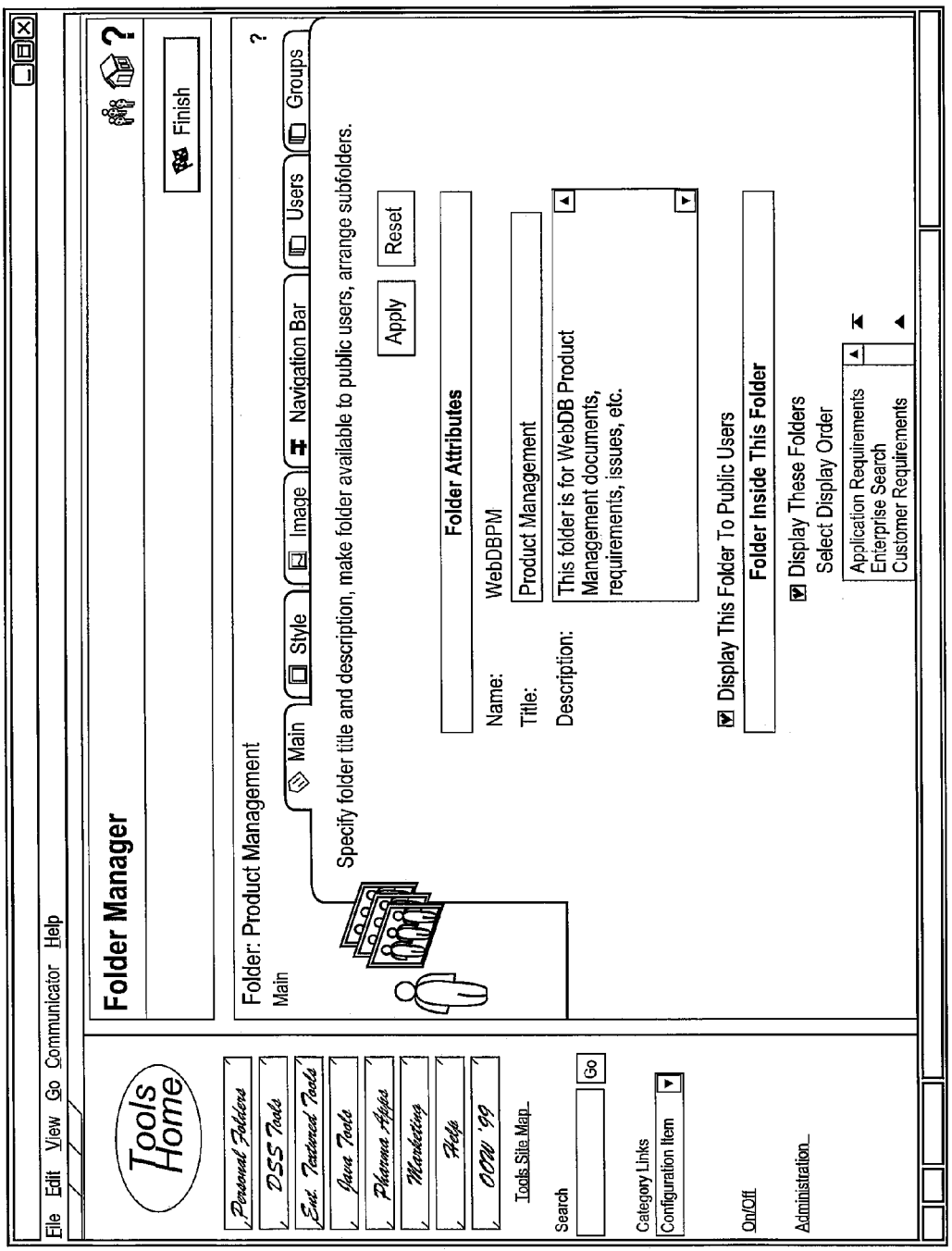
FIG. 22 illustrates one embodiment for specifying folder attributes in the folder manager.

FIG. 22 illustrates one embodiment for specifying folder attributes in the folder manager. In the folder attributes section, the user specifies a title for the folder, as well as provides a general description of the folder (e.g., this folder is for WebDB product management documents, requirements, issues, etc.). The folder attributes section also includes a check box to allow the user to specify display of the folder to public users. A display section permits the user to specify which holders to display within the parent folder, as well as select the display order for the sub folders.

Figure 23:
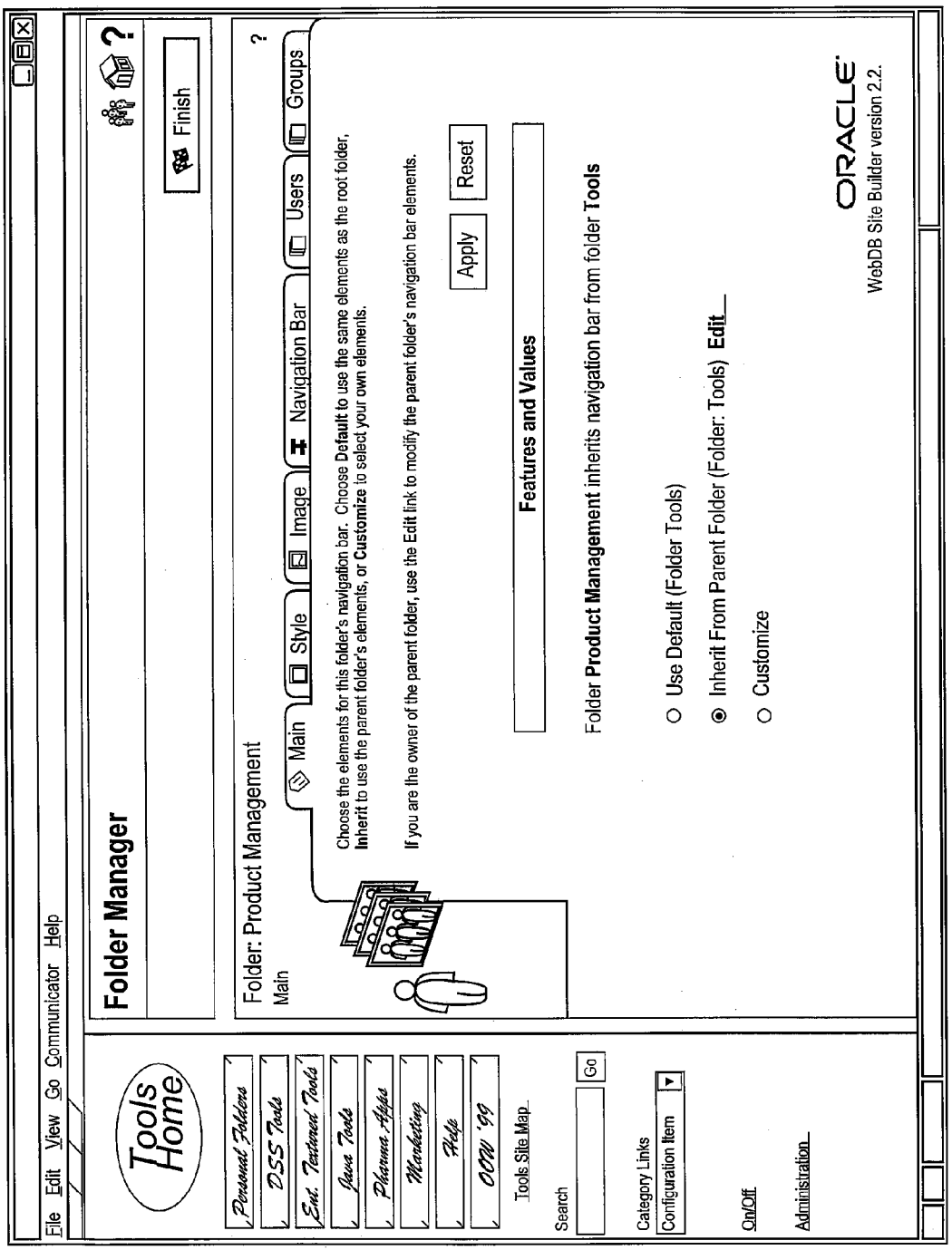
FIG. 23 illustrates a screen for the folder manager for specifying navigation bar features.

FIG. 23 illustrates a screen for the folder manager for specifying navigation bar features. This screen permits the user to choose elements for the folders navigation bar. Default results in the same elements for the navigation bar as the root folder. The folder inherits the navigation bar from the parent folder's elements. The customized selection permits the user to customize the navigation bar for this folder.

Figure 24:
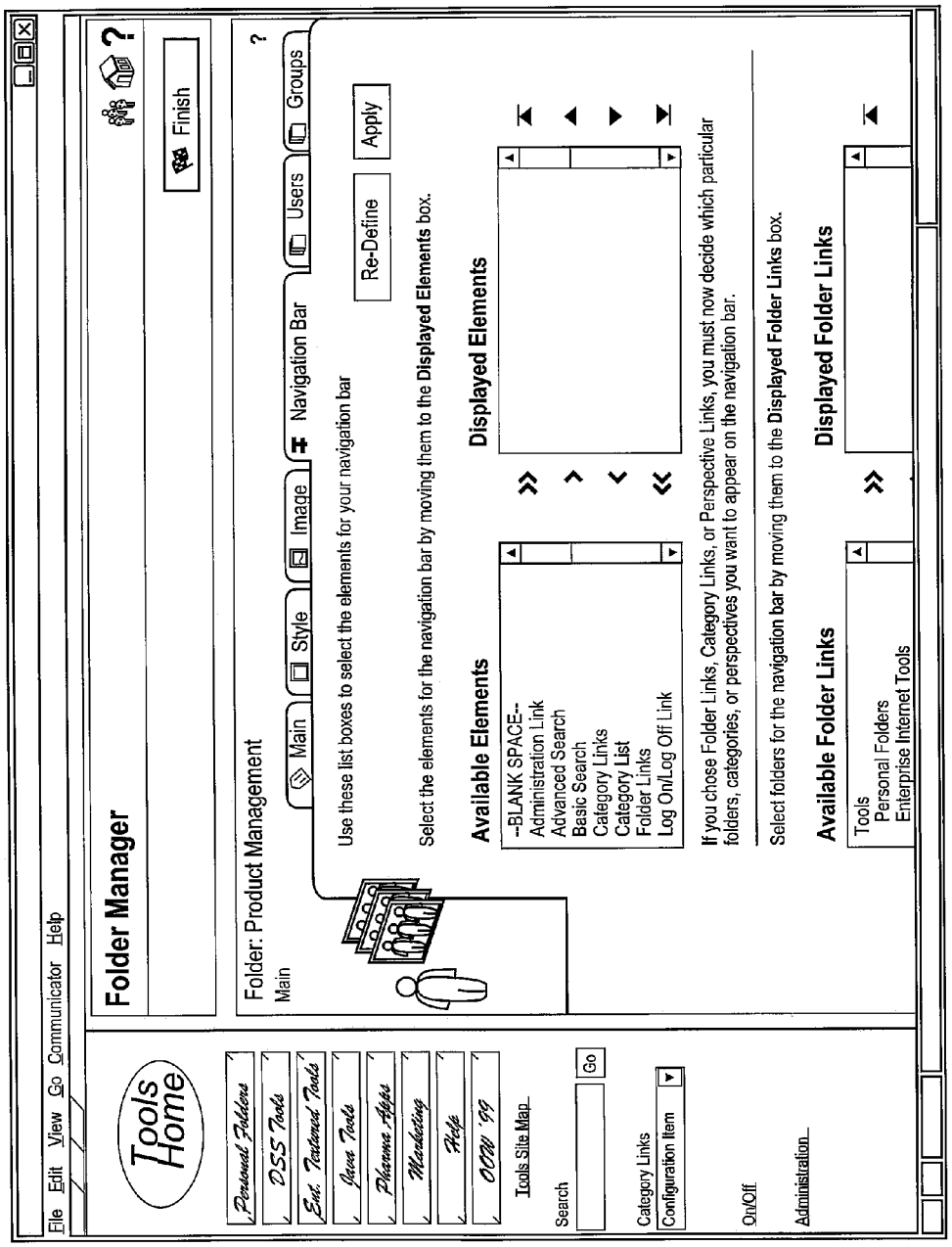
FIG. 24 illustrates a screen display to customize the navigation bar for a folder.

FIG. 24 illustrates a screen display to customize the navigation bar for a folder. Using this screen, the user selects from the available elements for display to customize the navigation bar. The user may also selects available folder links for the navigation bar by moving them to the displayed folder links box.

3. Creating and Editing Categories:

Before contributors began to add items to the Web Site, the site administrator collaborates with folder owners to determine which categories, and optionally perspectives, to create for the Web Site. Categories should be created to correspond to the different types of content on the Web Site. In one embodiment, the site administrator must first create a category before contributors can assigned an item to it. Once categories are created, the categories are visible to folder owners and contributors when adding or editing items.

Figure 25:
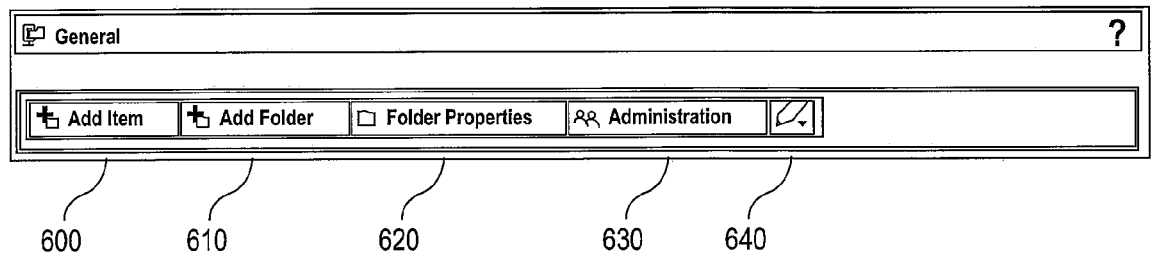
FIG. 25 illustrates a category dashboard to provide quick and easy access to the category features of the Web Site Database System.

FIG. 25 illustrates a category dashboard to provide quick and easy access to the category features of the Web Site Database System. As shown in FIG. 25, the category dashboard includes buttons for "add item" 600, "add category" 610, "category properties" 620, "administration" 630 and an icon, labeled 640, to "view folder."

Figure 26:
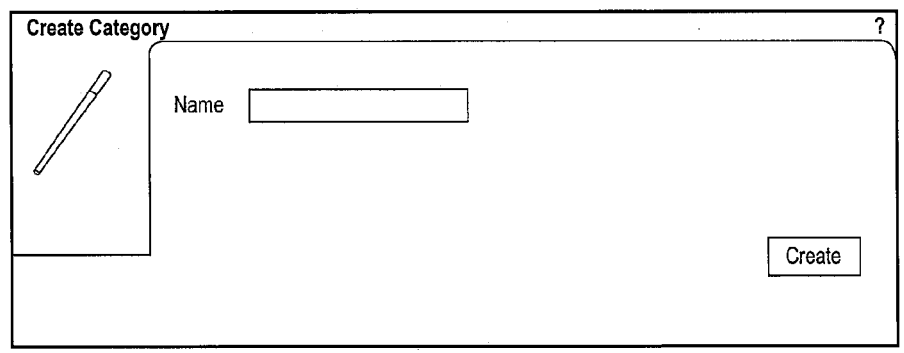
FIG. 26 illustrates an example create category panel.

As discussed above, all items added to the Web Site Database system are assigned to a category. In one embodiment, site administrators create categories. To create a category, the site administrator clicks the administration icon in the navigation bar, and the Web Site Database system displays the administration page. In the content manager section, the user clicks "category" to display the category manager. In part, the Web Site Database system displays a create category panel. FIG. 26 illustrates an example create category panel. In the "name" field, the user types the name of the category. Thereafter, the user clicks "create." Similarly, the category manager permits the user (i.e., site administrator) to create more categories, as well as find and edit existing categories.

In one embodiment, to create a new category, the user "clicks" on the administration 630 icon. The administration 630 icon displays the main administration page from which the user may access the various administration tools. On the administration page, the user clicks the category or the category link to display the category manager. In the create category name field, the user types a unique category and name. Then, the user clicks "create", and the newly created category is added to the find category list.

When a categories name is changed, all items previously associated with that category are automatically associated to the new name. To change the categories name, the user clicks the administration icon 630 or selects the administration link on the administration page. The user clicks the category link icon, or chooses the category link under content manager, to display the content category manager page.

Deleting a category deletes all items belonging to the category on the Web Site. A user may also associate an image with a category. Rather than displaying the category list or category links on the navigation bar, a user may choose to display an image that is associated to a category.

Figure 27:
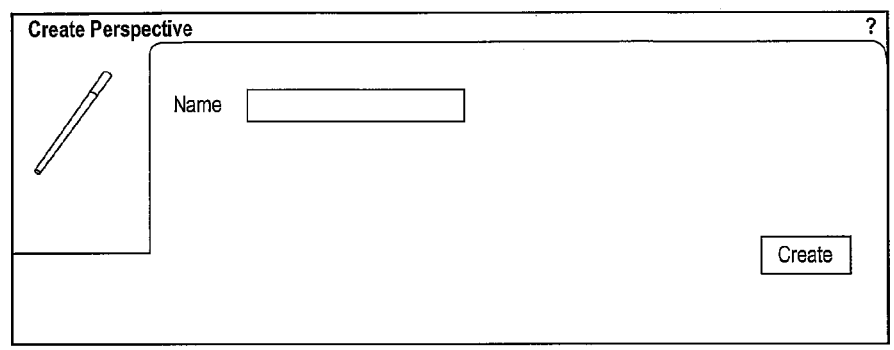
FIG. 27 illustrates one embodiment for a create perspectives panel.

4. Creating and Editing Perspectives:

As discussed above, each item added to the Web Site Database system may optionally the assigned to one or more perspectives. In one embodiment, site administrators create perspectives. To create a perspective, the user clicks the administration icon in the navigation bar. In response, the Web Site Database system displays the administration page. In the content manager section, the user clicks the perspective to display the perspective manager. In part, the Web Site Database system displays a create perspectives panel. FIG. 27 illustrates one embodiment for a create perspectives panel. In the name field, the user types in a name for the perspective. The user then clicks the create button. From the perspective manager, the user may create more perspectives, as well as find and edit existing perspectives.

Figure 28:
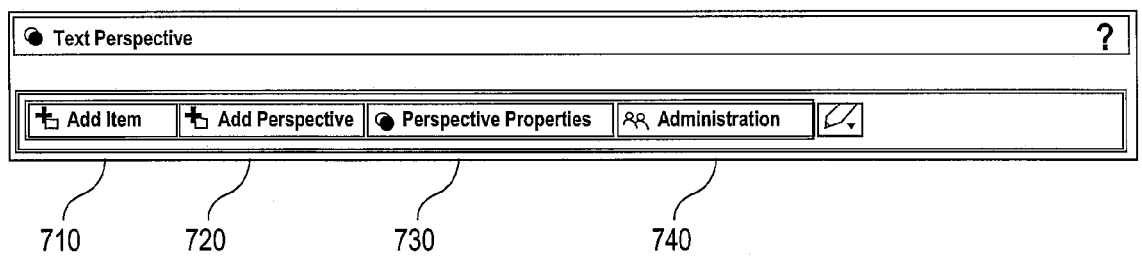
FIG. 28 illustrates one embodiment for the perspective dashboard.

In one embodiment, the Web Site Database includes a perspective dashboard. The perspective dashboard is designed to provide quick and easy access to the perspective functions. FIG. 28 illustrates one embodiment for the perspective dashboard. An add item 710 icon displays the item wizard to add an item to this perspective. The add perspective icon 720 displays the perspective manager to create or edit perspectives. The perspective properties icon 730 displays the perspective manager from which the user may define or edit the perspective properties. The administration icon 740 displays the main administration page from which the user may create the various administration tools. The view icon, 750, switches from edit mode to view mode.

5. Creating and Editing Styles:

As discussed above, the style of a Web Site determines how the Web Site looks. Folder owners may use an existing style to apply to their folders. In addition, site administrators may grant folder owners privileges to create their own styles. To design the style of the Web Site, the user clicks the administration icon in the navigation bar to display the administration page. In the Web Site Managers section, the user clicks "style" to display the style manager. In part, the Web Site Database system displays a create style panel.

Figure 29:
FIG. 29 illustrates one embodiment for a create style panel.

FIG. 29 illustrates one embodiment for a create style panel. In the name field, the user types an identification for a style. In the "Based on Style" section, the user may choose the "Main Site style. Using a base style provides the user with a starting point. The new style is created with the same settings as the Main Site Style. Then, the user may edit the new style settings to their own preferences. To accomplish this, the user clicks "Access: Private." By doing this, the style is only available to the user. After designing the style, the user may make this style available for other folder owners to use. To create the new style, the user proceeds by clicking the button "create" shown in the create style panel of FIG. 29. From the style manager, the user may create more styles, as well as find and edit existing styles.

Figure 30:
FIG. 30 illustrates one embodiment for the find style panel of the style manager.

To find a style, the user utilizes the "Find Style" panel of the style manager. FIG. 30 illustrates one embodiment for the find style panel of the style manager. For the example of FIG. 30, the user searches for the "tutorial style" as shown in the name list. From the panel, the user clicks "edit" to display the style editor.

Figure 31:
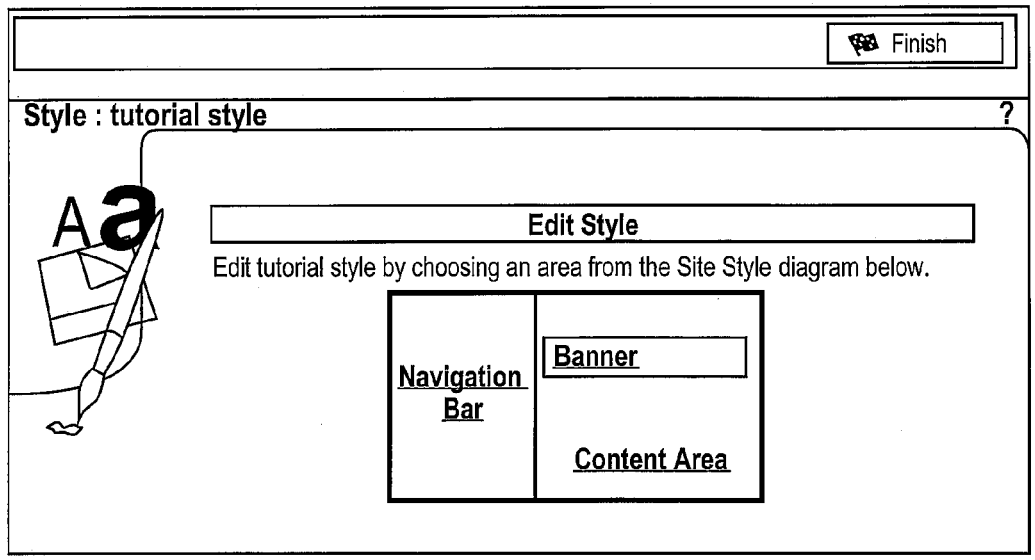
FIG. 31 illustrates one embodiment for the style editor.

FIG. 31 illustrates one embodiment for the style editor. From the style editor, the user may click the area of the site on the site style diagram for which the user desires to change a style setting (e.g., navigation bar, banner or content area). In the site style diagram, the user clicks the "navigation bar", to display the style manager "Main Page for the Navigation Bar."

Figure 32:
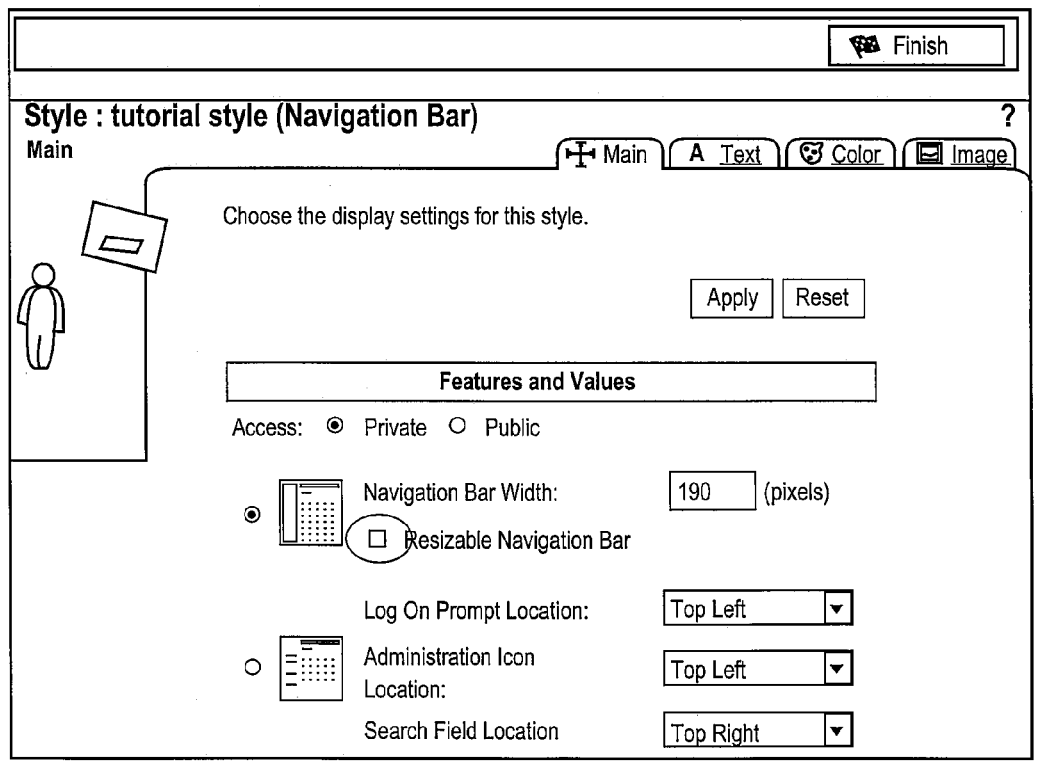
FIG. 32 illustrates an example style manager for the navigation bar.

FIG. 32 illustrates an example style manager for the navigation bar. The user may check "resizable navigation bar" to enable users to resize the navigation bar by dragging the frame border. By clicking the finish icon, the user saves his/her changes and returns to the style editor.

Figure 33:
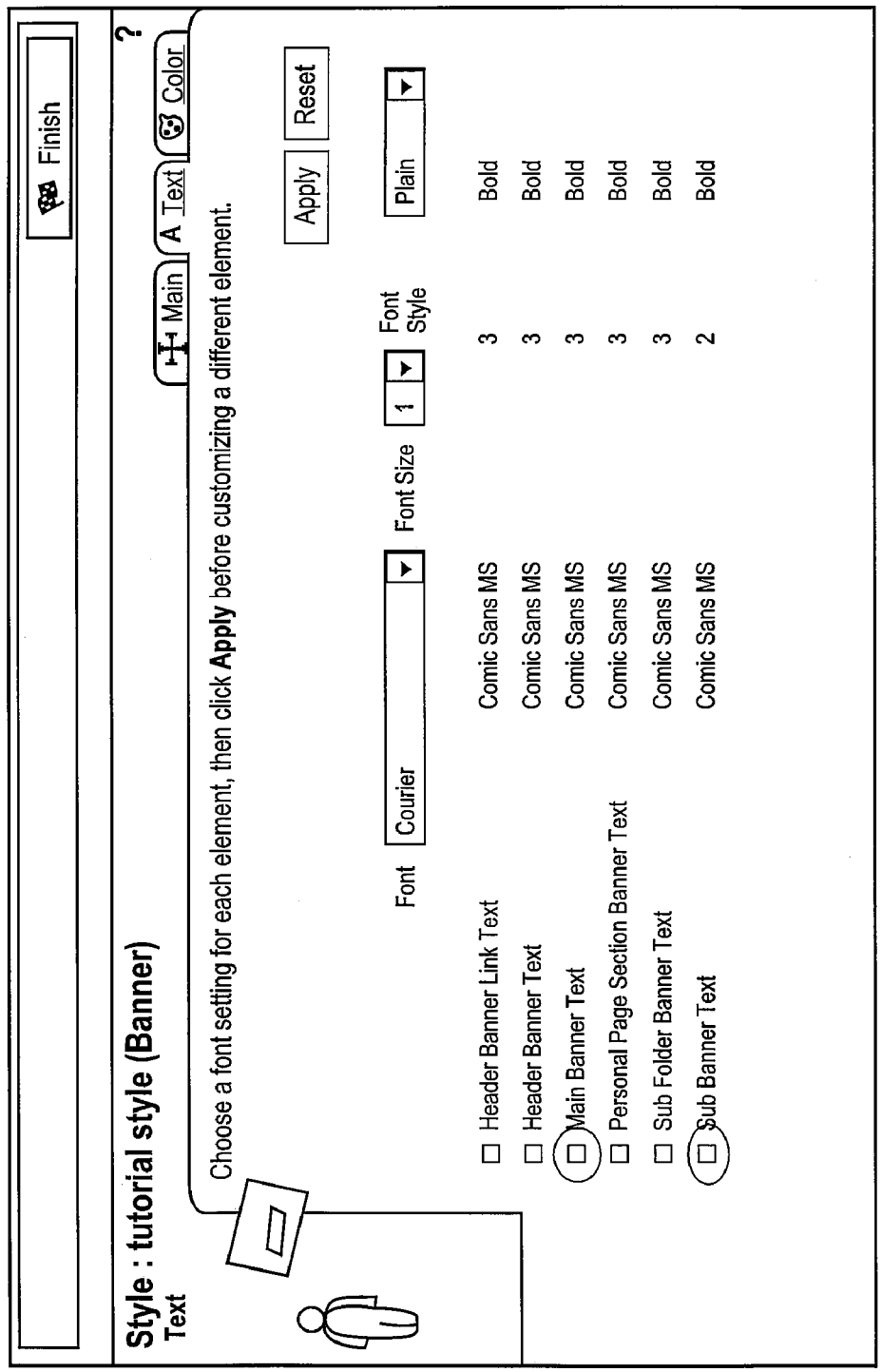
FIG. 33 illustrates one embodiment for the site style diagram for a banner.

In the site style diagram, the user may click "banner" to display the style manager "main page for the banner." FIG. 33 illustrates one embodiment for the site style diagram for a banner. For this example, the user may click the "text" tab to display the text page. From the "font" list, the user may choose a font other than the current setting. The user may also change the font size from the font size list, and may change the font style from the font style list. As highlighted in FIG. 33, the user may check the main banner text and sub banner text, followed by clicking the finish icon, to change the main banner text and sub banner text to the settings specified in the lists. The user then returns to the style editor.

Figure 34:
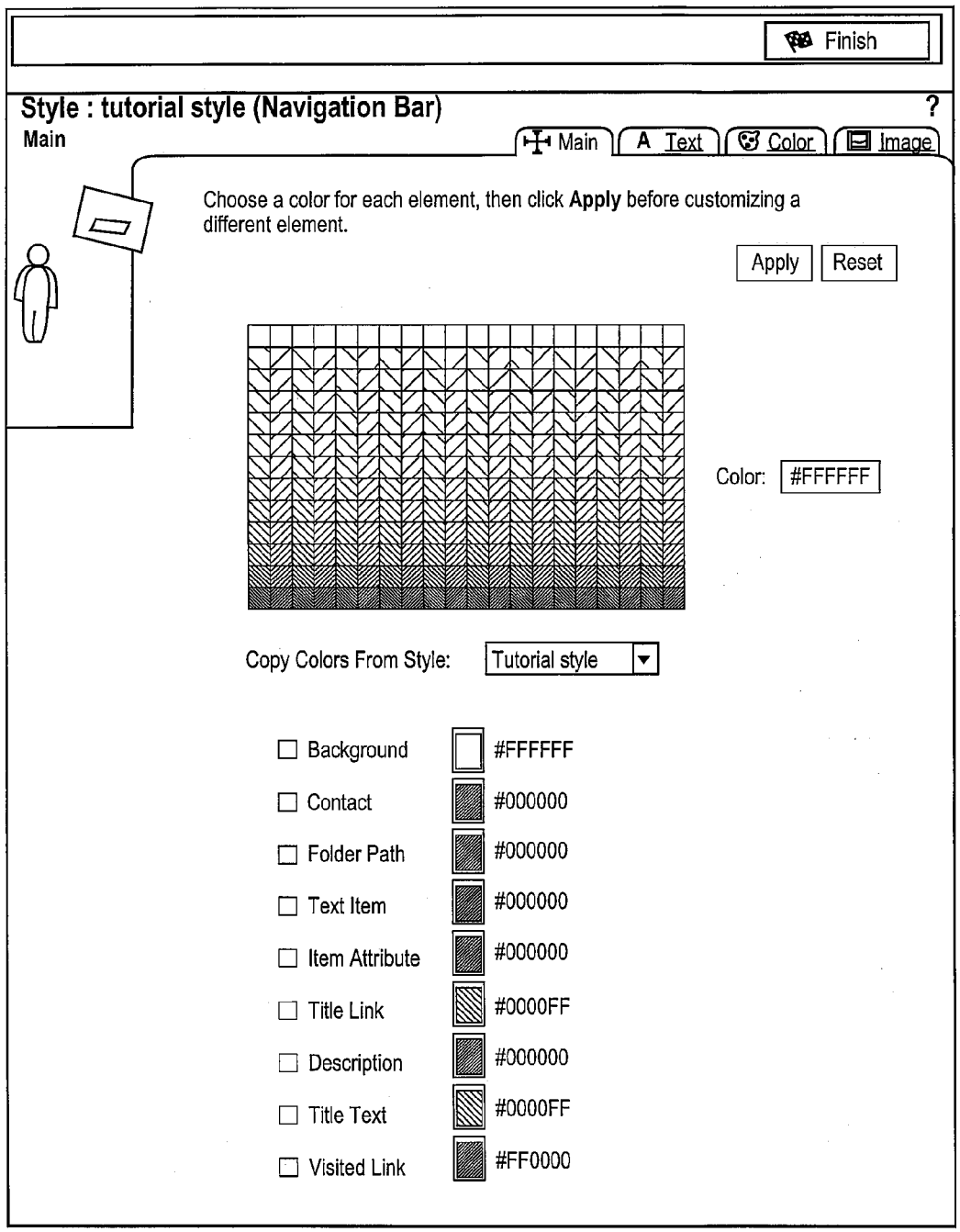
FIG. 34 illustrates one embodiment for the color page.

The user may click the color tab to display the color page. FIG. 34 illustrates one embodiment for the color page. The user may choose a color from the color palette. The user, from the Title Link, may change the Title Link color. The user may also change the background color.

The user may apply a style to a folder. To apply a style to a folder, the user begins by clicking the site logo at the top of the navigation bar to display the home page. The user then scrolls down the home page, and under the "Owned Folders" banner, clicks a folder (e.g., "products") to display the products folder. In the banner of the top of the page, the user clicks the "edit" icon to enter into edit mode. In response, the Web Site Database system displays the folder dashboard (FIG. 19). In the folder dashboard, the user clicks the "style editor" icon to display the style editor of the products folder where, depending upon the user's privileges, the user may: choose an existing style; edit the current style; and create a new style.

Figure 35:
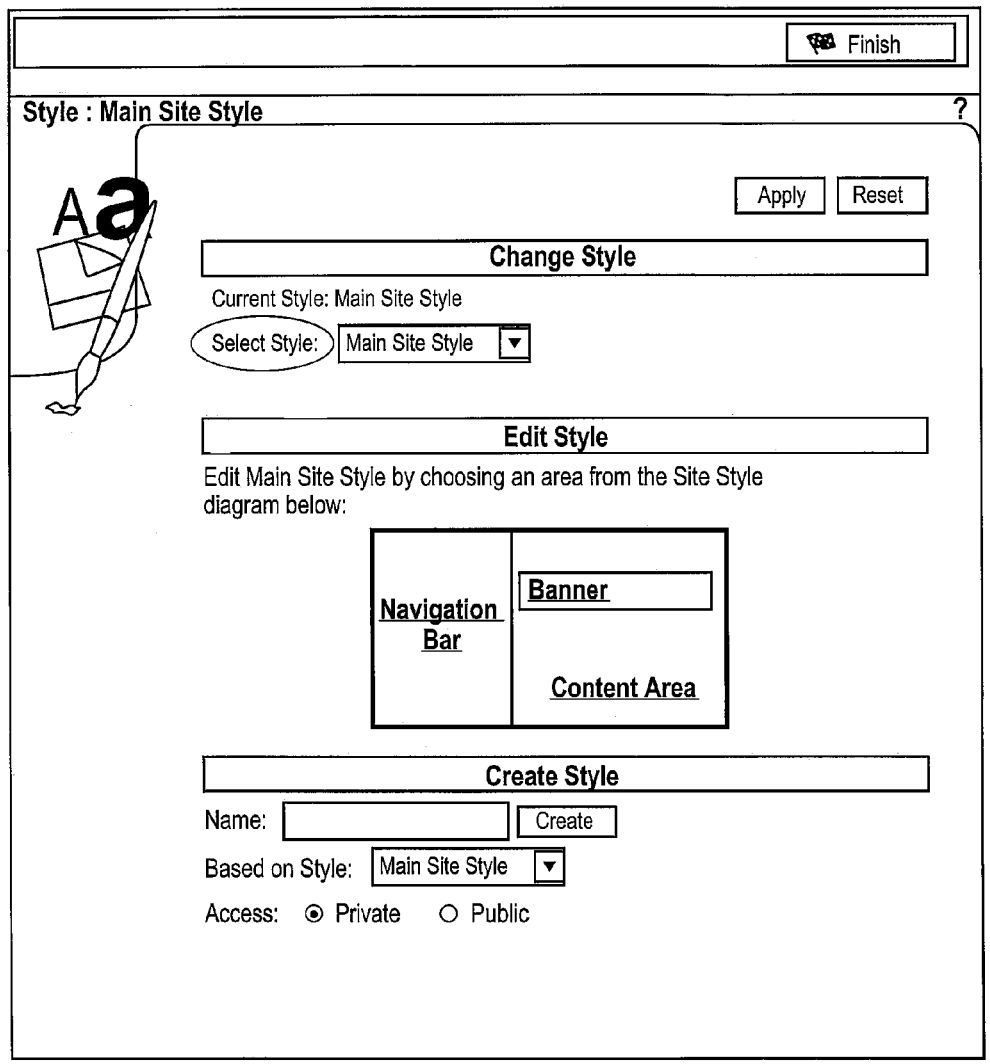
FIG. 35 illustrates one embodiment for the style editor.

FIG. 35 illustrates one embodiment for the style editor. For this example, the user may select a style from the "Select Style" list. The user may then click "finish" to save the changes and return to the products folder. The products folder now uses the style specified (e.g., the text in the banners at the top of page is the font specified, title links in the content area are the color specified, and the content area itself is the color specified, etc.).

6. Creating and Editing Groups

In one embodiment, to create a group in the Web Site database system, a group panel is used. FIG. 36 illustrates one embodiment for a create group panel. The create group panel is accessible from the access manager. As shown in FIG. 36, this page is divided into the create group panel and the find group panel. An administrator may create a group by typing the name in the field provided and by selecting the create button. The find group panel is used to locate existing groups such as for editing the groups.

Figure 37:
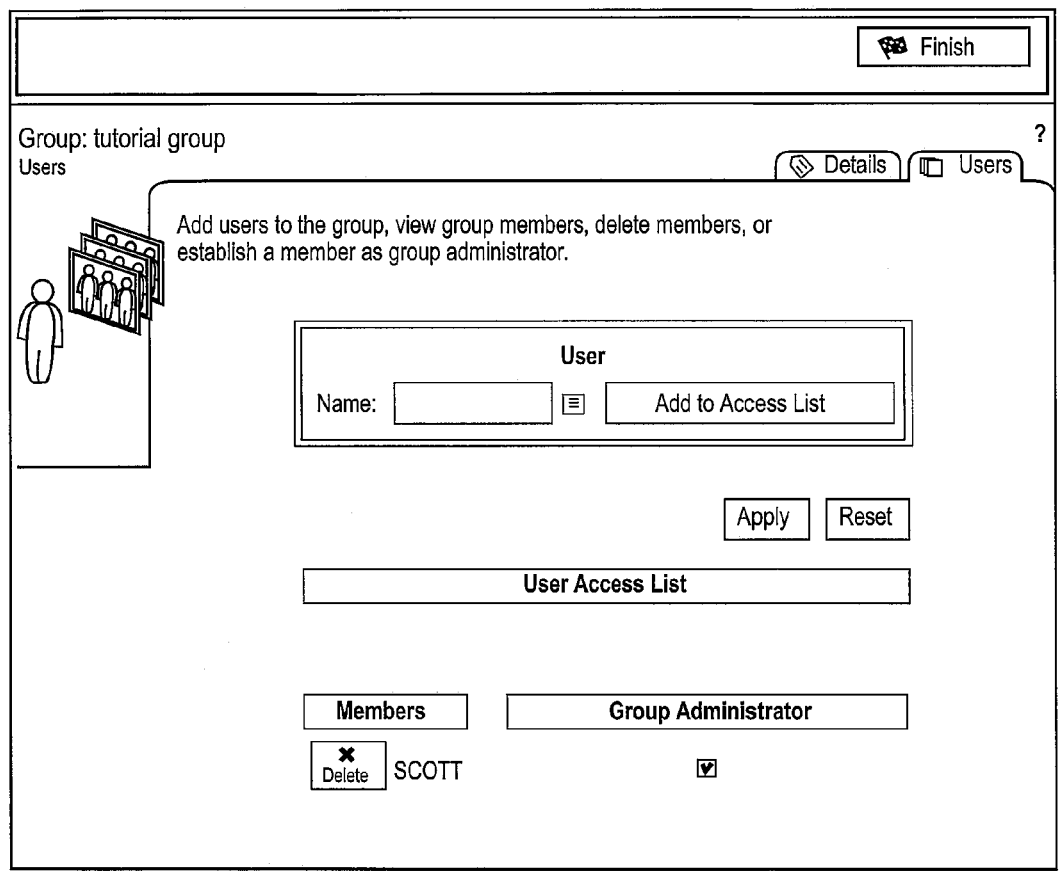
FIG. 37 illustrates one embodiment to modify groups.

FIG. 37 illustrates one embodiment to modify groups. Specifically, this screen permits an administrator to add users to a group, view group members, delete members, or specify a member as a group administrator. To add a member to a group, the administrator types the user name in the name field, and selects the "add to access list" button. As shown in FIG. 37, a check box to designate group administrators is provided.

Granting Privileges in the Web Site Database:

When end-users first display a Web Site, they may only view items in public folders. For greater access to the Web Site, users must log onto the Web Site using their database username and password. Once users log onto the Web Site, the tasks they perform on a folder depends upon the privileges they have been granted for that folder. In one embodiment, if the end-user has an own privilege, then the end-user may perform all folder tasks, including granting folder privileges to other users. If the end-user has a view privilege, the end-user may view any item in the folder. A style privilege permits an end-user to make changes to the folder style. A manage item privilege permits an end-user to add, edit, or delete items in the folder. Also, a "create with approval" privilege permits an end-user to add new items to the folder. Items that are added using the "create with approval" privilege must be approved by the folder owner before displayed publicly.

To limit access to items in a folder owned by a folder owner, the folder owner grants the appropriate access privileges. For example, if the information in a folder is of a confidential nature, the folder owner may want only a few users to view the contents. For example, in one application, a company may want to use a confidential folder, a sub folder of the products folder, to make confidential product information available to its employees. However, the company does not want the company's customers to view this information. Under this scenario, company employees have the privilege to view the confidential folder, whereas the customers do not have the privilege to view the confidential folder.

A folder owner may desire to grant the same privileges to multiple users. For example, the folder owner may want to allow all the members of a department in a corporation to add items to the department's folder. Under this scenario, rather than individually granting each user the "create with approval privileges", the folder owner may create a group of users and may grant, in a single operation, the privileges to all members of this group.

A folder owner or an individual with manage items privileges on a folder, may add, edit, move and delete items in that folder. When an item is added to a folder by a folder owner or an individual with manage items privileges, then that item is immediately visible in the folder. An individual with "create with approval" privileges may only add items to the folder. Under this scenario, the item does not become visible to other users until the folder owner approves the item. This feature enables the folder owner to maintain control of the folder's content.

Figure 38:
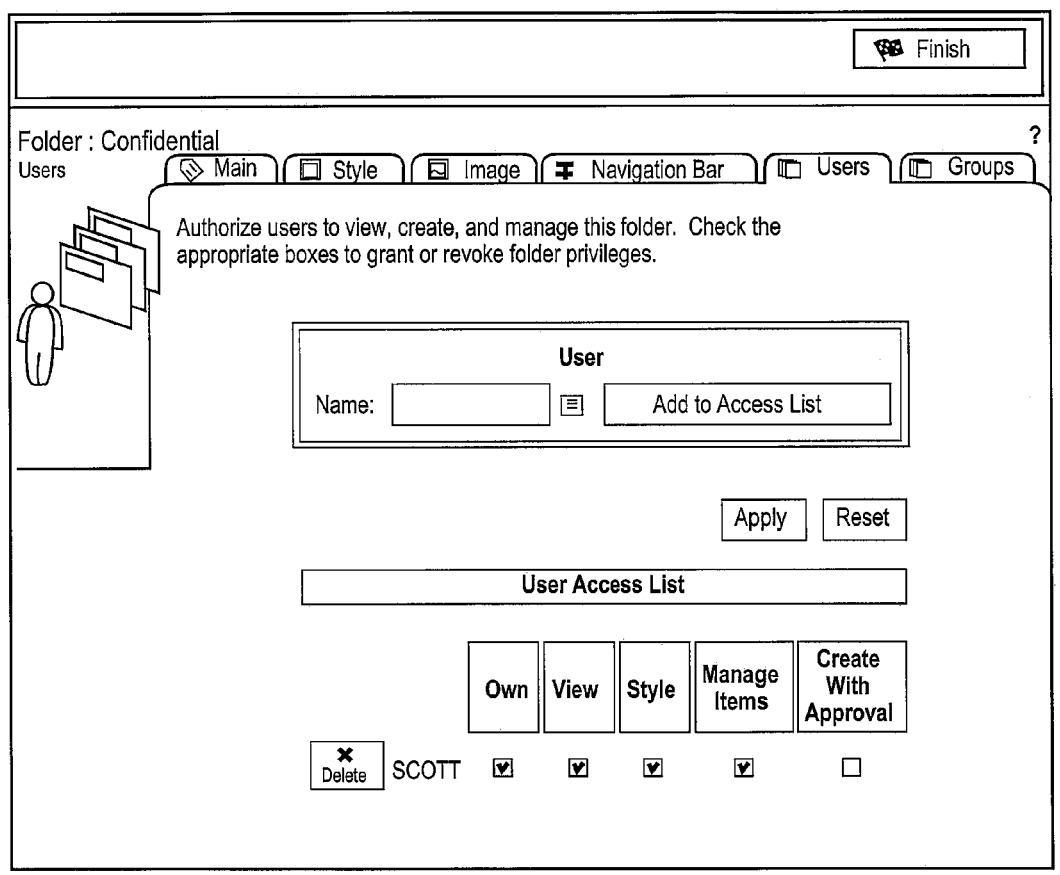
FIG. 38 illustrates one embodiment for granting user privileges.

FIG. 38 illustrates one embodiment for granting user privileges. In general, this screen provides the ability to authorize users to view, create, and manage items in a corresponding folder. Specifically, from the user dialog box, a user name is associated with the folder to provide access to that folder. As shown below in FIG. 38, a user access list permits setting privileges associated with that folder (i.e., own, view, style, manage items, and create with approval).

Figure 39:
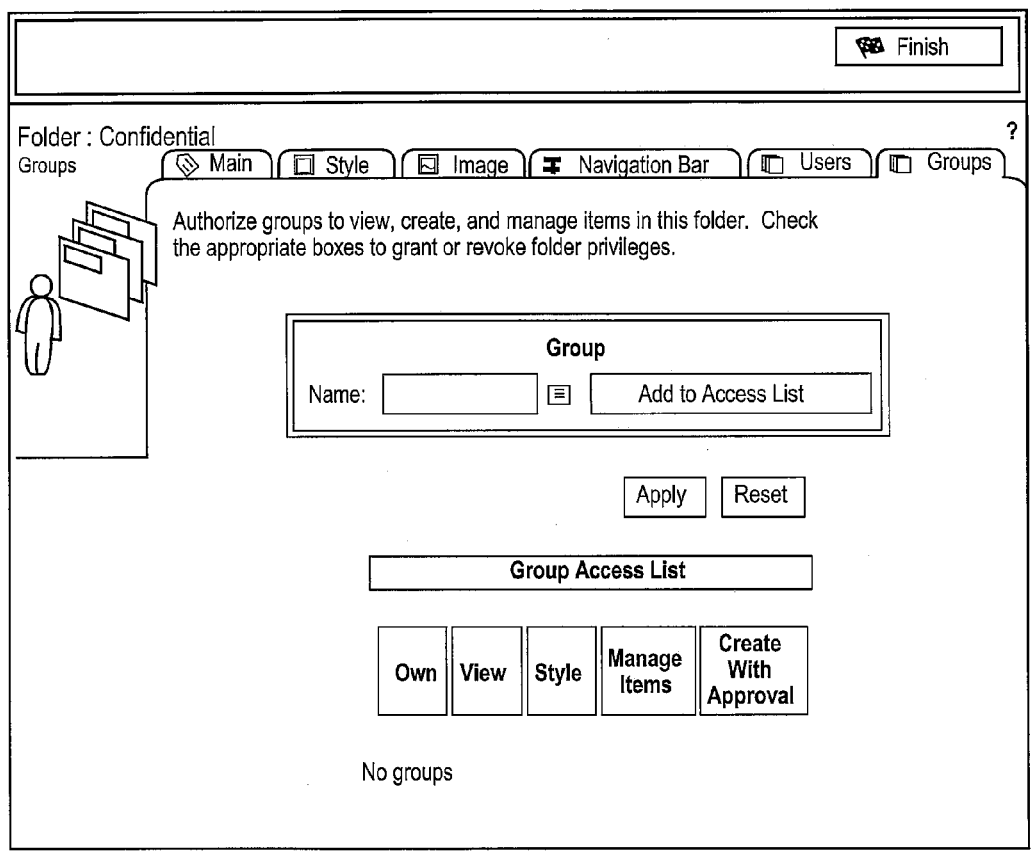
FIG. 39 illustrates one embodiment for setting group privileges to a folder.

FIG. 39 illustrates one embodiment for setting group privileges to a folder. As shown in FIG. 39, the administrator, in the group box, may select from a predefined group to add access to the folder. Furthermore, through the group access list, the site administrator may specify individual access privileges (i.e., own, view, style, manage items, and create with approval).

Although the present invention has been described in terms of specific exemplary embodiments, it will be appreciated that various modifications and alterations might be made by those skilled in the art without departing from the spirit and scope of the invention.

What is claimed is:

1. A machine-implemented method of managing content at a web site, the method comprising:
   receiving a first request from a user to create a particular content item in a particular folder associated with the web site;
   in response to the first request, inspecting permission data to determine that said user has create-with-approval privileges relative to said particular folder;
   in response to determining that said user has create-with-approval privileges relative to said particular folder, adding said particular content item to said particular folder in a not-publicly-visible state;
   in response to receiving input that grants approval for the particular item to be created in the particular folder, changing the state of the particular content item to a publicly-visible state;
   receiving a second request;
   in response to the second request, determining a current state of the particular content item;
   if the current state of the particular content item is the publicly-visible state, then responding to the second request by providing a web page that includes said particular content item; and
   if the current state of the particular content item is in the not-publicly-visible state, then responding to the second request by providing a web page that does not include said particular content item.

2. The method of claim 1, wherein receiving the first request comprises:
   receiving the first request to create the particular content item in the particular folder by storing the particular content item in a database in a location that identifies the particular content item resides in the particular folder.

3. The method of claim 1, further comprising:
   after the particular content item has been added to said particular folder in a not-publicly-visible state, updating mapping data that indicates a folder-to-content item mapping.

4. The method of claim 1, wherein the create-with-approval privilege was granted to the user by a folder owner of the particular folder.

5. The method of claim 1, further comprising:
   in response to receiving input from a folder owner, associating a style attribute with the particular folder, wherein the style attribute describes how to display content items that belong to the particular folder; and
   displaying the particular content item in accordance with the style attribute.

6. The method of claim 1, further comprising:
   in response to determining that said user is a folder owner or has manage-item-privileges relative to said particular folder, adding said particular content item to said particular folder in a publicly-visible state.

7. A machine-readable storage medium carrying one or more sequences of instructions for managing content at a web site, wherein execution of the one or more sequences of instructions by one or more processors causes:

receiving a first request from a user to create a particular content item in a particular folder associated with the web site;

in response to the first request, inspecting permission data to determine that said user has create-with-approval privileges relative to said particular folder;

in response to determining that said user has create-with-approval privileges relative to said particular folder, adding said particular content item to said particular folder in a not-publicly-visible state;

in response to receiving input that grants approval for the particular item to be created in the particular folder, changing the state of the particular content item to a publicly-visible state;

receiving a second request;

in response to the second request, determining a current state of the particular content item;

if the current state of the particular content item is the publicly-visible state, then responding to the second request by providing a web page that includes said particular content item; and if the current state of the particular content item is in the not-publicly-visible state, then responding to the second request by providing a web page that does not include said particular content item.

8. The machine-readable storage medium of claim 7, wherein receiving the first request comprises:

receiving the first request to create the particular content item in the particular folder by storing the particular content item in a database in a location that identifies the particular content item resides in the particular folder.

9. The machine-readable storage medium of claim 7, wherein execution of the one or more sequences of instructions by the one or more processors further causes:

after the particular content item has been added to said particular folder in a not-publicly-visible state, updating mapping data that indicates a folder-to-content item mapping.

10. The machine-readable storage medium of claim 7, wherein the create-with-approval privilege was granted to the user by a folder owner of the particular folder.

11. The machine-readable storage medium of claim 7, wherein execution of the one or more sequences of instructions by the one or more processors further causes:

in response to receiving input from a folder owner, associating a style attribute with the particular folder, wherein the style attribute describes how to display content items that belong to the particular folder; and displaying the particular content item in accordance with the style attribute.

12. The machine-readable storage medium of claim 7, wherein execution of the one or more sequences of instructions by the one or more processors further causes:

in response to determining that said user is a folder owner or has manage-item-privileges relative to said particular folder, adding said particular content item to said particular folder in a publicly-visible state.

* * * * *

UNITED STATES PATENT AND TRADEMARK OFFICE
CERTIFICATE OF CORRECTION

| | | |
|---|---|---|
| PATENT NO. | : 7,404,141 B1 | Page 1 of 1 |
| APPLICATION NO. | : 09/540977 | |
| DATED | : July 22, 2008 | |
| INVENTOR(S) | : Giljum et al. | |

It is certified that error appears in the above-identified patent and that said Letters Patent is hereby corrected as shown below:

On title page, item 54, in column 1, under "Title", line 1, delete "WEBSITE" and insert -- WEB SITE --, therefor.

On title page, item 75, in column 1, under "Inventors", line 2, delete "Washington, DC" and insert -- Sunnyvale, CA --, therefor.

In column 1, line 2, delete "WEBSITE" and insert -- WEB SITE --, therefor.

Signed and Sealed this

Fifteenth Day of December, 2009

David J. Kappos
*Director of the United States Patent and Trademark Office*